(12) United States Patent
Mou et al.

(10) Patent No.: US 10,620,106 B2
(45) Date of Patent: Apr. 14, 2020

(54) PARTICULATE MATTER MEASURING DEVICE

(71) Applicant: Microjet Technology Co., Ltd., Hsinchu (TW)

(72) Inventors: Hao-Jan Mou, Hsinchu (TW);
Shih-Chang Chen, Hsinchu (TW);
Jia-Yu Liao, Hsinchu (TW);
Yung-Lung Han, Hsinchu (TW);
Chi-Feng Huang, Hsinchu (TW);
Chang-Yen Tsai, Hsinchu (TW);
Chiu-Lin Lee, Hsinchu (TW);
Hsuan-Kai Chen, Hsinchu (TW);
Wei-Ming Lee, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 16/181,911

(22) Filed: Nov. 6, 2018

(65) Prior Publication Data
US 2019/0187035 A1    Jun. 20, 2019

(30) Foreign Application Priority Data

Dec. 15, 2017  (TW) .............................. 106144158 A
Dec. 15, 2017  (TW) .............................. 106144159 A
(Continued)

(51) Int. Cl.
*G01N 15/06* (2006.01)
*G01N 15/02* (2006.01)
(Continued)

(52) U.S. Cl.
CPC ....... *G01N 15/0211* (2013.01); *G01N 1/2273* (2013.01); *G01N 15/06* (2013.01);
(Continued)

(58) Field of Classification Search
CPC ........... G01N 15/06; G01N 2015/0046; G01N 2015/0693; G01N 15/1434;
(Continued)

(56) References Cited

U.S. PATENT DOCUMENTS

2006/0250606 A1   11/2006   Kaye et al.
2006/0267756 A1   11/2006   Kates
(Continued)

FOREIGN PATENT DOCUMENTS

JP    2011-27079 A     2/2011
TW    201727068 A     8/2017
(Continued)

OTHER PUBLICATIONS

Extended European Search Report, dated Apr. 18, 2019, for European Application No. 18204544.3.

*Primary Examiner* — Michael P Stafira
(74) *Attorney, Agent, or Firm* — Birch, Stewart, Kolasch & Birch, LLP

(57) ABSTRACT

A particulate matter measuring device includes a gas transporting actuator, a micro particle sensor and a laser module. The micro particle sensor is disposed corresponding in position to the gas transporting actuator. The laser module is disposed between the gas transporting actuator and the micro particle sensor and emits a laser beam between the gas transporting actuator and the micro particle sensor. The air flowing between the gas transporting actuator and the micro particle sensor is irradiated by the laser beam. The micro particle sensor analyzes sizes of suspended particles in the air and calculates concentrations of the suspended particles. The air is ejected at high speed by the gas transporting actuator to perform a cleaning operation on a surface of the micro particle sensor so as to remove the suspended particles
(Continued)

on the surface of the micro particle sensor and maintain accuracy of the micro particle sensor.

20 Claims, 19 Drawing Sheets

(30) Foreign Application Priority Data

Jan. 12, 2018 (TW) .............................. 107101332 A
Aug. 30, 2018 (TW) .............................. 107130415 A

(51) Int. Cl.
  *G01N 1/22* (2006.01)
  *G01N 15/00* (2006.01)
  *G01N 21/15* (2006.01)

(52) U.S. Cl.
  CPC ................ *G01N 2015/0046* (2013.01); *G01N 2015/0693* (2013.01); *G01N 2021/151* (2013.01)

(58) Field of Classification Search
  CPC ....... G01N 15/1459; G01N 2015/1006; G01N 15/0205; G01N 15/2011; G01N 15/1484; G01N 1/4077; G01N 15/1429; G01N 2001/4088; G01N 2015/0053; G01N 2015/0065; G01N 2015/1486; G01N 2015/149; G01N 2015/1493; G01N 21/6486; G01N 33/48721; G01N 33/54326; G01N 15/0656; G01N 15/1404; G01N 15/1436; G01N 15/1463; G01N 1/02; G01N 1/2205; G01N 1/2273; G01N 1/405; G01N 2015/0088; G01N 2015/1409; G01N 21/51; G01N 21/53; G01N 21/532; G01N 2458/10; G01N 33/5302; G01N 33/5308; G01N 33/54306; G01N 33/5438; G01N 15/00; G01N 15/02; G01N 15/0227; G01N 15/0255; G01N 15/042; G01N 15/0606; G01N 15/0618; G01N 15/14; G01N 15/1427; G01N 15/1456; G01N 15/147; G01N 1/10; G01N 1/2035; G01N 1/2202; G01N 1/28; G01N 1/34; G01N 2001/007; G01N 2001/028; G01N 2001/1025; G01N 2001/2223; G01N 2001/2826; G01N 2001/4083; G01N 2015/0038; G01N 2015/0049; G01N 2015/0096; G01N 2015/0233; G01N 2015/0238; G01N 2015/0288; G01N 2015/045; G01N 2015/1438; G01N 2015/1454; G01N 2015/1497; G01N 2021/036; G01N 2021/151; G01N 2021/1738; G01N 2021/4707; G01N 2021/4709; G01N 2021/4711; G01N 2021/6439; G01N 2021/6482; G01N 2021/653; G01N 2021/825; G01N 21/0303; G01N 21/05; G01N 21/1702; G01N 21/251; G01N 21/255; G01N 21/31; G01N 21/3563; G01N 21/4785; G01N 21/534; G01N 21/6402; G01N 21/6428; G01N 21/6458; G01N 21/65; G01N 21/78; G01N 2201/0221; G01N 2201/061; G01N 2201/06113; G01N 2201/0612; G01N 2201/06146; G01N 2201/0668; G01N 2201/0697; G01N 2201/08; G01N 2458/00; G01N 2458/15; G01N 27/22; G01N 27/3271; G01N 27/3272; G01N 27/3277; G01N 27/447; G01N 27/44756; G01N 27/745; G01N 29/2418; G01N 33/32; G01N 33/487; G01N 33/48707; G01N 33/5091; G01N 33/542; G01N 33/54333; G01N 33/54346; G01N 33/54366; G01N 33/558; G01N 33/58; G01N 35/00029; G01N 35/00069; G01N 35/00584; G01N 35/0098; G01N 35/0099; G01N 35/10; G01N 35/1002; G01N 15/1425; G02B 6/255; G02B 6/2553; G02B 6/2555; G02B 6/2556; G02B 6/2557; G02B 6/2558; G02B 6/3885; G02B 1/11; G02B 1/115; G02B 21/0008; G02B 21/16; G02B 21/32; G02B 5/0226; G02B 5/0242; G02B 5/0247; G02B 5/0268; G02B 5/0284; G02B 5/0294; G02B 5/0841; G02B 5/208; G02B 5/285; G01B 9/021; G01J 2003/2806; G01J 3/0205; G01J 3/0208; G01J 3/0229; G01J 3/0272; G01J 3/0289; G01J 3/0291; G01J 3/10; G01J 3/2803; G01J 3/501; G01J 3/524

See application file for complete search history.

(56) References Cited

U.S. PATENT DOCUMENTS

| | | | |
|---|---|---|---|
| 2008/0278725 | A1 | 11/2008 | Unger |
| 2010/0050750 | A1* | 3/2010 | Saaski ................. G01N 1/2205 73/61.75 |
| 2014/0178220 | A1 | 6/2014 | Fujisaki et al. |
| 2014/0247450 | A1 | 9/2014 | Han |
| 2016/0153884 | A1 | 6/2016 | Han et al. |
| 2017/0023457 | A1 | 1/2017 | Hart et al. |
| 2017/0222123 | A1 | 8/2017 | Chen et al. |
| 2017/0370809 | A1* | 12/2017 | Miller-Lionberg ......... G01N 1/2273 |
| 2018/0052425 | A1* | 2/2018 | Ozcan ................. G03H 1/0866 |

FOREIGN PATENT DOCUMENTS

TW            M552227 U      11/2017
WO     WO 2017/101038 A1     6/2017

* cited by examiner

PARTICULATE MATTER MEASURING DEVICE

FIELD OF THE DISCLOSURE

The present disclosure relates to a particulate matter measuring device, and more particularly to a particulate matter measuring device capable of automatically performing a cleaning operation of a micro particle sensor included therein.

BACKGROUND OF THE DISCLOSURE

Nowadays, the air pollution problems are becoming increasingly serious in our country and its neighboring regions. In particular, the concentration of fine suspended particles (e.g. Particulate Matter 2.5, PM 2.5) is often too high. Hence, the monitoring of the concentration of suspended particles in the air is getting attention and various detection devices have also been invented accordingly. At present, the particulate matter detecting device on the market for detecting the concentration of suspended particulates works by utilizing a light beam of infrared light or laser light to illuminate the gas in the gas flow channel. When the light beam hits the suspended particles in the gas, scattering occurs. Then, by detecting and collecting the scattered light, the particle size of the suspended particles and the numbers of suspended particles with different sizes in the unit space can be calculated according to the Mie scattering theory.

However, since the particulate matter measuring device has a gas flow path in fluid communication with the external environment and a micro particle sensor for detecting the scattered light is also disposed in the gas flow path, the pollutant from the external environment is easily attached to the micro particle sensor to affect the detection of the scattered light and cause errors in the calculation results. In response to this issue, the current solution is to perform compensation calculation by means of software. In practical, the amount of suspended particles in the air from the external environment tends to vary with time instead of maintaining a fixed value. There is often a certain deviation generated between the compensated and corrected detection value and the actual results. Therefore, when the particulate matter measuring device for detecting the concentration of suspended particles is used, the micro particle sensor is susceptible to the issue of being polluted and shaded by of the suspended particles from the external environment, which is an urgent need for the industry to solve.

SUMMARY OF THE DISCLOSURE

A particulate matter measuring device having an automatic cleaning function of the present disclosure is provided to detect a concentration of suspended particles in air and be capable of automatically performing a cleaning operation on a micro particle sensor. The cleaning operation prevents the pollutant in air from attaching to the micro particle sensor, thereby avoiding deviations occurred in detection results.

In accordance with an aspect of the present disclosure, there is provided a particulate matter measuring device used for measuring a concentration of suspended particles in air. The particulate matter measuring device includes a gas transporting actuator, a micro particle sensor and a laser module. The micro particle sensor is disposed corresponding in position to the gas transporting actuator. The laser module is disposed between the gas transporting actuator and the micro particle sensor and configured to emit a laser beam between the gas transporting actuator and the micro particle sensor. The air flowing between the gas transporting actuator and the micro particle sensor is irradiated by the laser beam and the micro particle sensor analyzes sizes of the suspended particles in the air to calculate the concentration of the suspended particles in the air.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
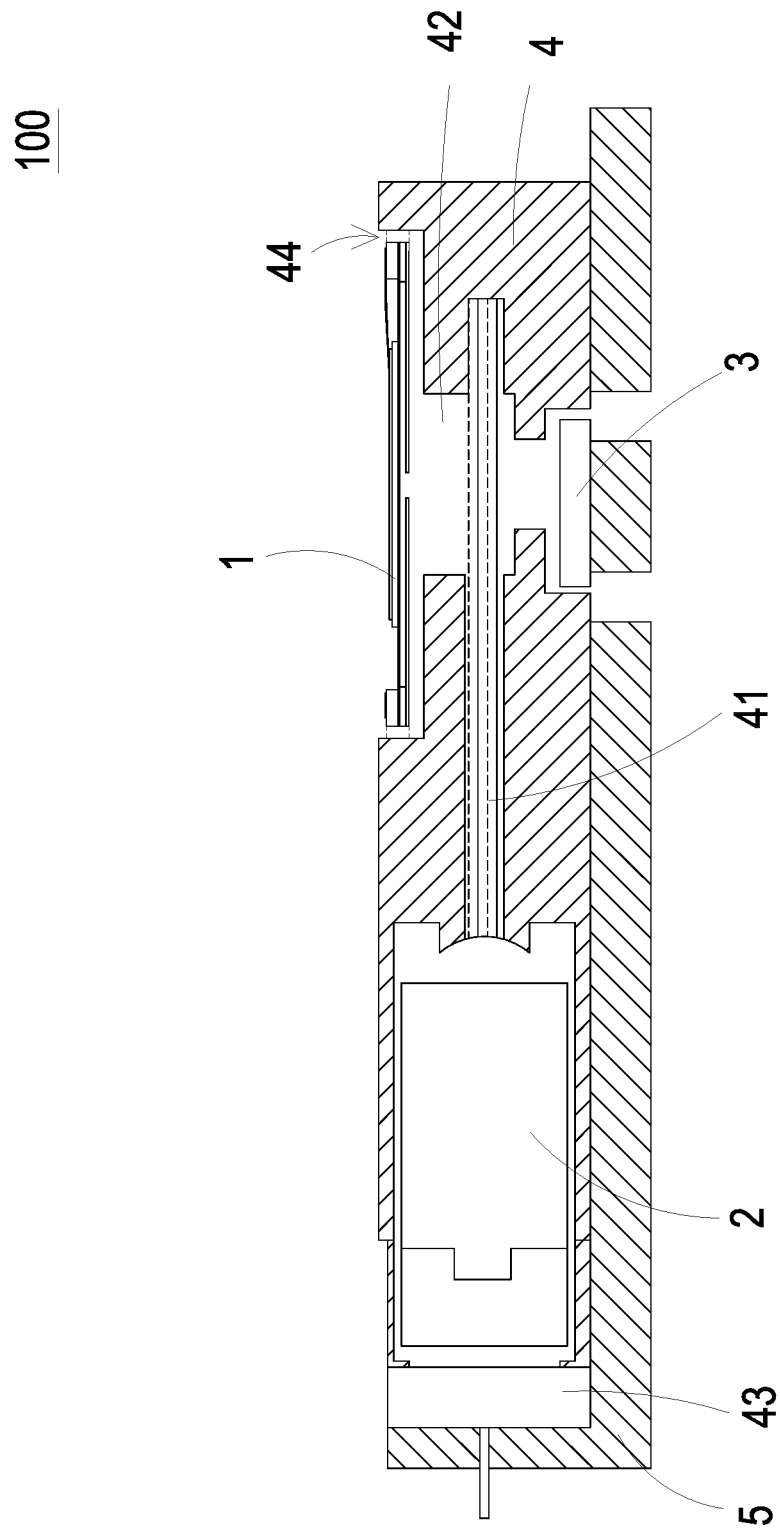
FIG. 1 is a schematic cross-sectional view illustrating a particulate matter measuring device according to a first embodiment of the present disclosure.

Please refer to FIG. 1. The present disclosure provides a particulate matter measuring device 100 including at least one gas transporting actuator 1, at least one laser module 2 and at least one micro particle sensor 3, wherein the air flowing between the gas transporting actuator 1 and the micro particle sensor 3 is irradiated by the laser beam and the micro particle sensor 3 analyzes sizes of the suspended particles in the air to calculate the concentration of the suspended particles in the air. The numbers of the gas transporting actuator 1, the laser module 2 and the micro particle sensor 3 are exemplified by one for each respectively in the following embodiments but not limited thereto. It is noted that each of the gas transporting actuator 1, the laser module 2 and the micro particle sensor 3 can also be provided in plural numbers.

The particulate matter measuring device 100 of the present disclosure is used to detect concentrations of suspended particles in the air. The suspended particles detected can be for example suspended particles PM2.5 or suspended particles PM10. Please refer to FIG. 1. In the first embodiment, the particle matter measuring device 100 includes a gas transporting actuator 1, a laser module 2, a micro particle sensor 3, an irradiating mechanism 4 and a driving circuit module 5. The irradiating mechanism 4 is a physical component and disposed between the gas transporting actuator 1 and the micro sensor 3. The irradiating mechanism 4 has a light-beam channel 41 and an airflow channel 42 disposed therein. In the embodiment, the airflow channel 42 is preferably but not limited to a straight line channel. The light-beam channel 41 is a straight line channel and in communication with the airflow channel 42. In the embodiment, the airflow channel 42 and the light-beam channel 41 are disposed orthogonally to each other. In the embodiment, the irradiating mechanism 4 further has a light-source receiving slot 43 and an accommodation slot 44. The light-source receiving slot 43 is disposed on an end of the light-beam channel 41, and the accommodation slot 44 is disposed on an end of the airflow channel 42. The light-source receiving slot 43 and the accommodation slot 44 can be for example but not limited to one of a square, a circle, an ellipse, a triangle and a polygon.

The gas transporting actuator 1 is disposed at the end of the airflow channel 42 of the irradiating mechanism 4 for being driven to inhale the air. In the embodiment, the gas transporting actuator 1 is fixed and accommodated within the accommodation slot 44 of the irradiating mechanism 4, but not limited thereto.

The laser module 2 is disposed within the light-source receiving slot 43 of the irradiating mechanism 4 and is used to emit a laser beam. The laser beam is emitted through the light-beam channel 41 to irradiate the airflow channel 42. Thereby, the laser beam emitted from the laser module 2 passes through the airflow channel 42 to irradiate the air that flows in the airflow channel 42.

The micro particle sensor 3 is disposed at an end of the airflow channel 42 away from the accommodation slot 44. After the laser beam irradiates the air flowing in the airflow channel 42, the micro particle sensor 3 detects scattered light spots generated by the suspended particles, so as to calculate accordingly the sizes and the concentration of the suspended particles contained in the air.

Please refer to FIG. 1 again. In the embodiment, the driving circuit module 5 includes a transmission module (not shown) and a microprocessor (not shown). The microprocessor is used to drive the gas transporting actuator 1, the laser module 2 and the micro particle sensor 3, and analyze, calculate and store a detected result from the micro particle sensor 3. When the microprocessor is enabled to drive the gas transporting actuator 1, the laser module 2 and the micro particle sensor 3, the gas transporting actuator 1 introduces the air to flow into the airflow channel 42 and the air flowing in the airflow channel 42 is irradiated by the laser beam emitted from the laser module 2. Thus, the micro particle sensor 3 detects scattered light spots generated by the suspended particles irradiated in air flowing in the airflow channel 42 and a detected result is transmitted to the microprocessor. According to the detected result, the microprocessor analyzes the sizes of the suspended particles in the air, calculates the concentration of the suspended particles and thus generates a detected value accordingly. The detected value is stored in the microprocessor. Thereafter, the transmission module transmits the detected value stored in the microprocessor to an external connection device (not shown). The external connection device can be one selected from the group consisting of a cloud system, a portable device and a computer system, so as to display the detected valve and a notification alert.

During the detection process of the particulate matter measuring device 100 or at a predetermined time point, the microprocessor drives the gas transporting actuator 1 to introduce the air from the external environment into the gas transporting actuator 1 and the gas transporting actuator 1 ejects the air at high speed to the airflow channel 42. Thereby, a cleaning operation is performed on a surface of the micro particle sensor 3 to remove the suspended particles attached thereon, so as to maintain accuracy of the micro particle sensor 3. The predetermined time point described above can be the time before performing the gas detection or plural predetermined time points with a fixed time interval. For example, the cleaning operation is performed automatically every three minutes. The predetermined time point can be also controlled manually by the user or dynamically determined by the software based on the detected value calculated in real time. The present disclosure is not limited thereto.

Moreover, the transmission module can be connected to the external connection device through a wired transmission technology or wireless transmission technology. In an embodiment, the transmission module can be a wired transmission module and selected from the group consisting of USB, mini-USB and micro-USB. In another embodiment, the transmission module can be a wireless transmission module and selected from the group consisting of a Wi-Fi module, a Bluetooth module, a radio frequency identification module and a near field communication module.

Figure 2:
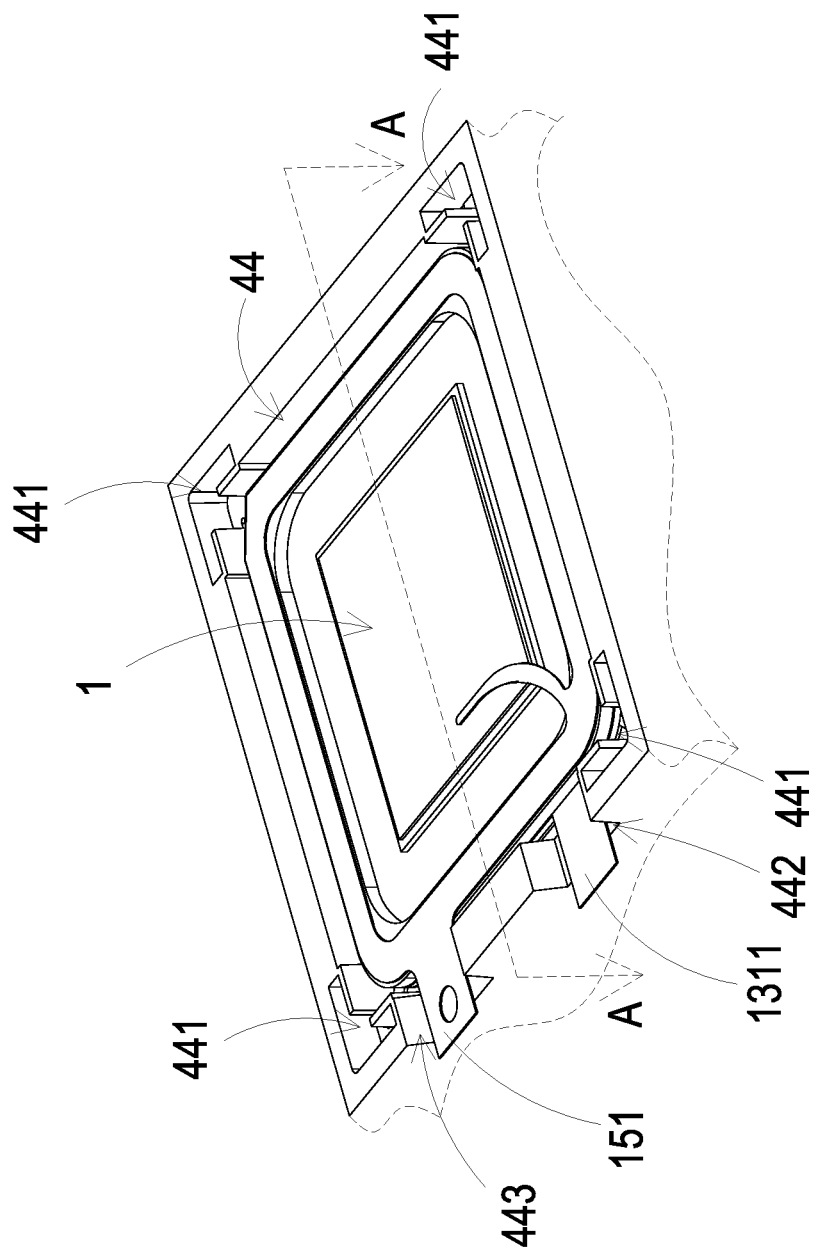
FIG. 2 is a schematic perspective view illustrating the accommodation slot and the gas transporting actuator of the first embodiment of the present disclosure.
Figure 3A:
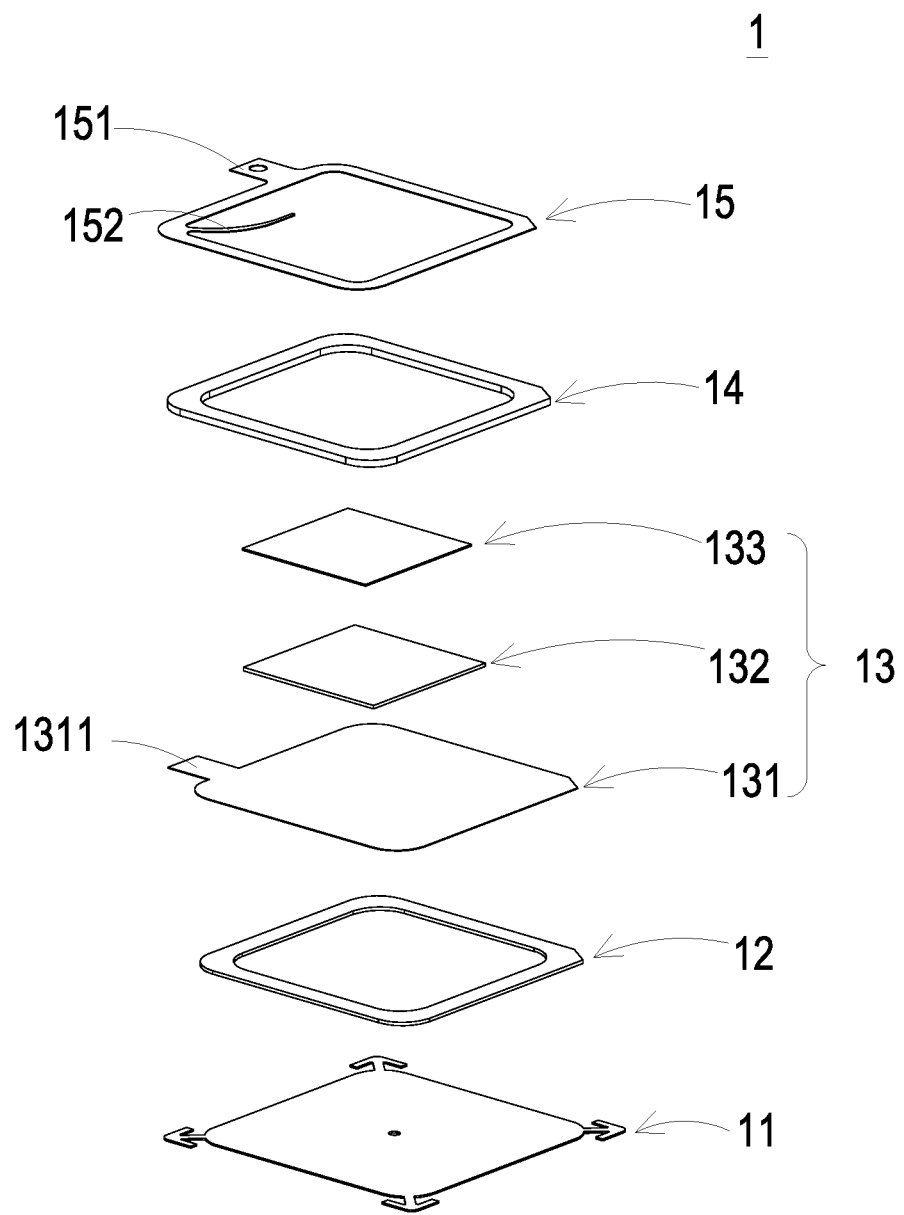
FIG. 3A is an exploded view illustrating the gas transporting actuator of the first embodiment of the present disclosure and taken from a top view.
Figure 3B:
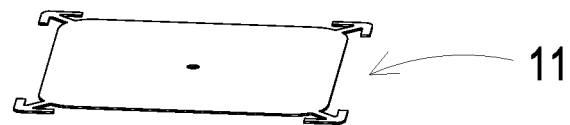
FIG. 3B is an exploded view illustrating the gas transporting actuator of the first embodiment of the present disclosure and taken from a bottom view.
Figure 3B:
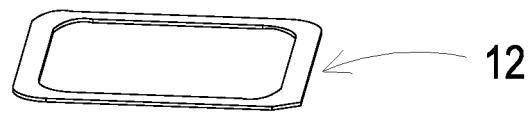
Figure 3B:
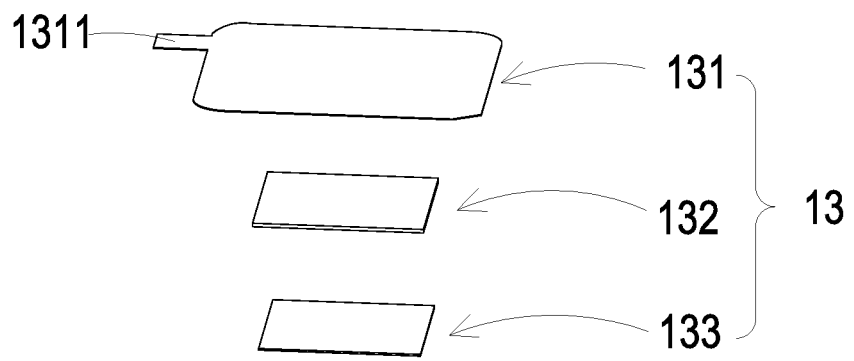
Figure 3B:
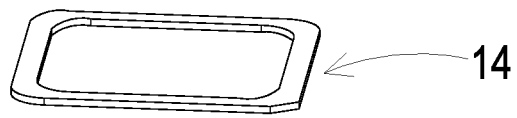
Figure 3B:
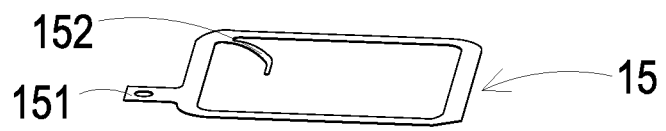

Please refer to FIGS. 2, 3A and 3B. In the first embodiment, the gas transporting actuator 1 is a micro gas transporting structure and can massively transport the air at high speed. The gas transporting actuator 1 includes a gas transporting plate 11, a chamber bracket 12, an actuator 13, an insulation bracket 14 and a conducting bracket 15 stacked on each other sequentially.

Figure 4:
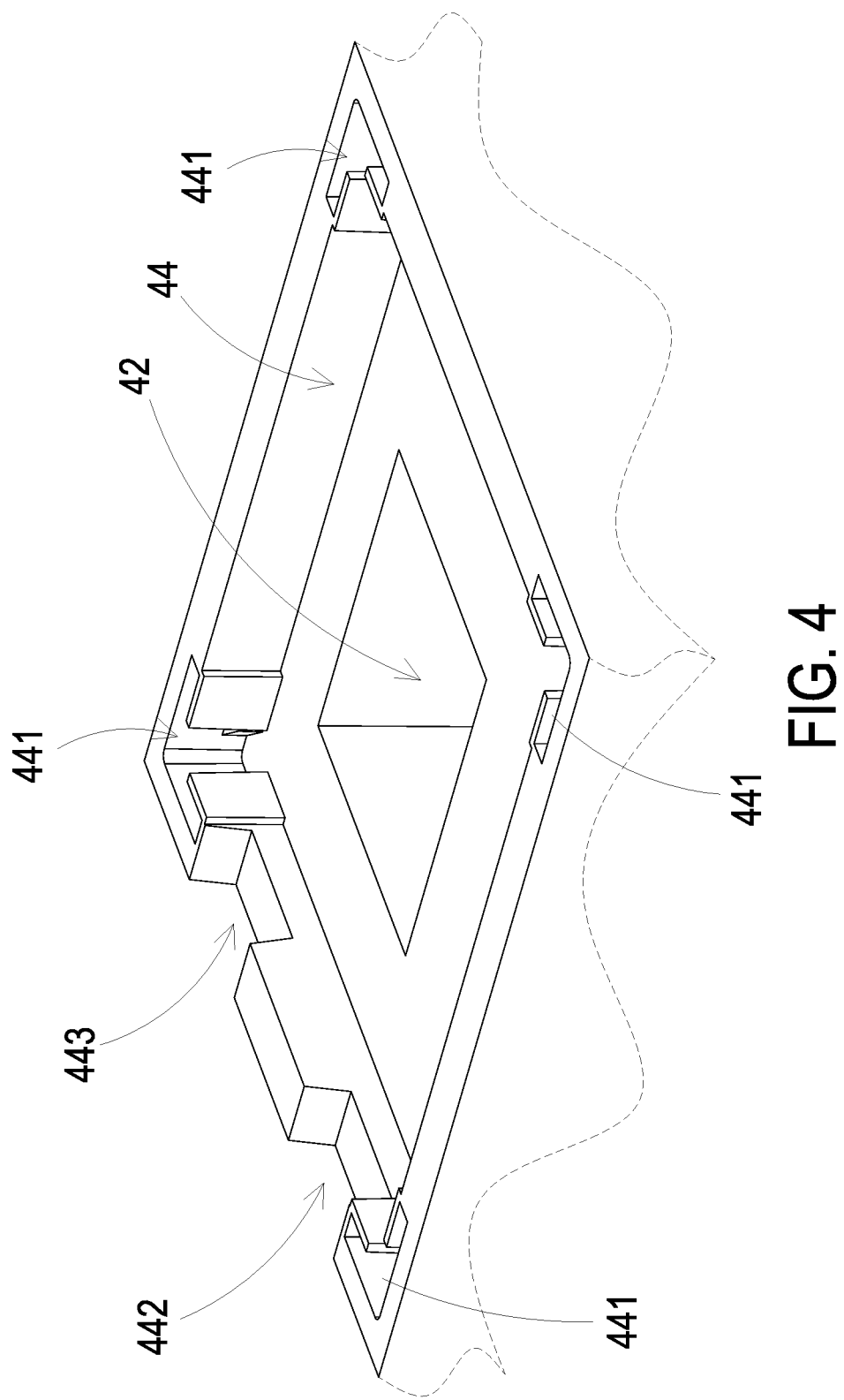
FIG. 4 is a perspective view illustrating the accommodation slot of the first embodiment of the present disclosure.

Please refer to FIG. 4. The accommodation slot 44 has plural fixing recesses 441 for allowing the gas transporting plate 11 to be fastened thereon. In the embodiment, there are four fixing recesses 441 disposed at four corners of the accommodation slot 44, respectively. The fixing recesses 411 are L-shaped recesses, but not limited thereto. The number and the shape of the recesses are adjustable according to the practical requirements. The accommodation slot 44 further includes a first recess 442 and a second recess 443 disposed on one lateral side thereof.

Please refer to FIGS. 3A, 3B, 4 and 5. The gas transporting plate 11 is produced by a flexible material and has a suspension plate 110, a central aperture 111 and plural connection components 112. The suspension plate 110 is a sheet structure, which is permitted to undergo a bending vibration, and has shape and size corresponding to the inner edge of the accommodation slot 44, but not limited thereto. The shape of the suspension plate 110 can be one selected from the group consisting of a square, a circle, an ellipse, a triangle and a polygon. The central aperture 111 runs through the center of the suspension plate 110 for the air flowing therethrough. In the embodiment, there are four connection components 112, but not limited thereto. The number and shape of the connection components 112 are corresponding to the fixing recesses 441. Each connection component 112 and the corresponding fixing recess 441 have shapes corresponding to each other and form a snap structure, so as to be engaged and fixed with each other. However, the present disclosure is not limited thereto and can be varied according to the practical requirements.

Figure 5:
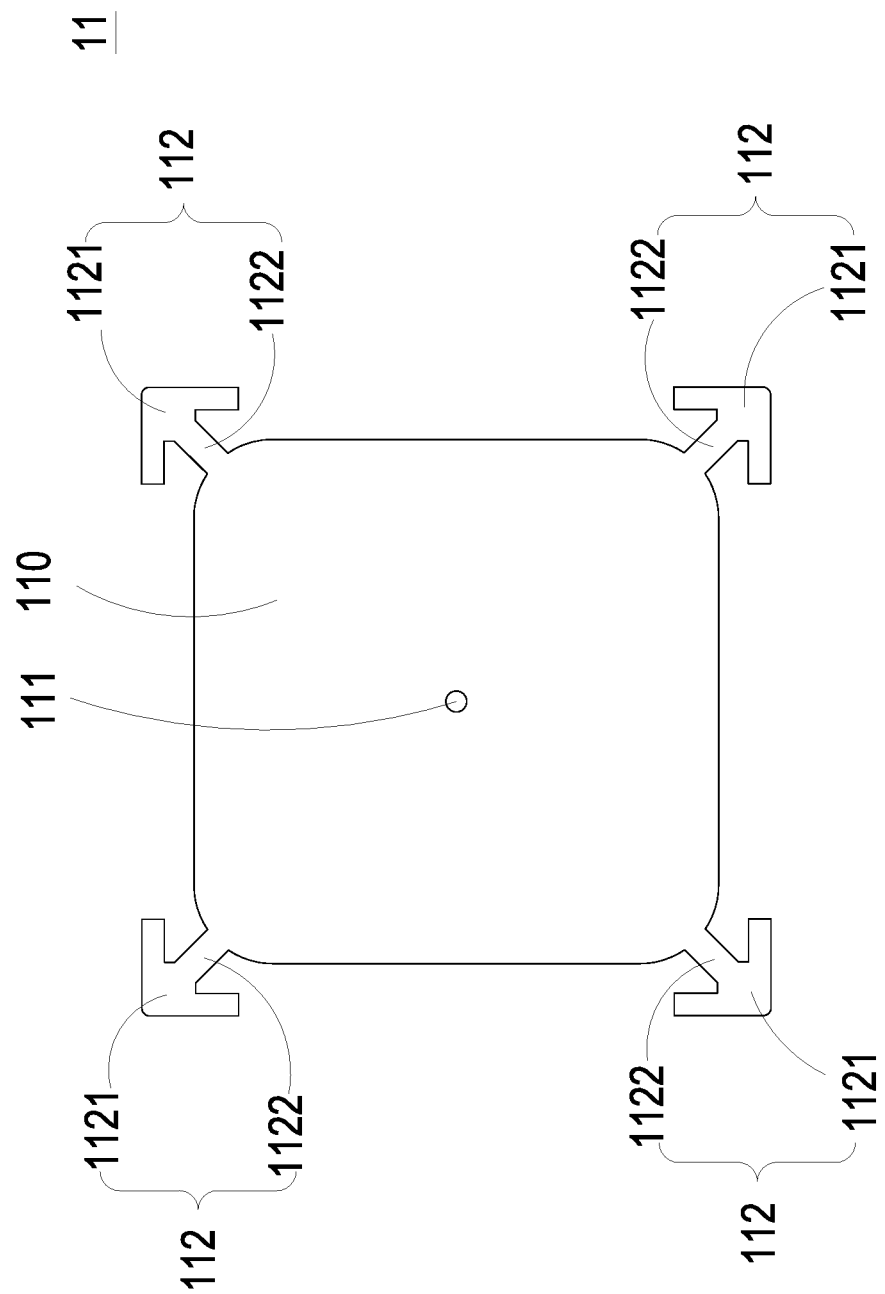
FIG. 5 is a top view illustrating the gas transporting plate of the first embodiment of the present disclosure.

For example, as shown in FIGS. 4 and 5, each connection component 112 has a fixing part 1121 and a connection part 1122. The fixing part 1121 and the corresponding fixing recess 441 have shapes corresponding to each other, which are L-shaped. Namely, the fixing part 1121 is an L-shaped physical structure and the fixing recess 441 is an L-shaped recess. When the fixing part 1121 is received within the corresponding fixing recess 441, both of them are engaged and combined with each other, by which the gas transporting plate 11 is received within the accommodation slot 44. With the designed snap structure, a positioning effect is generated in the horizontal direction and the connection strength between the gas transporting plate 11 and the accommodation slot 44 is enhanced. Moreover, during the assembly process, the designed snap structure allows the gas transporting plate 11 to be positioned in the accommodation slot 44 quickly and accurately. Accordingly, the designed snap structure has advantages of being light, simple in design, convenient for assembly and positioning with precision and easily. At the same time, the connection part 1122 of the connection component 112 is connected between the suspension plate 110 and the fixing part 1121 and has an elastic strip structure, so that the suspension plate 110 is allowed to bend and vibrate in a reciprocating manner.

Figure 6A:
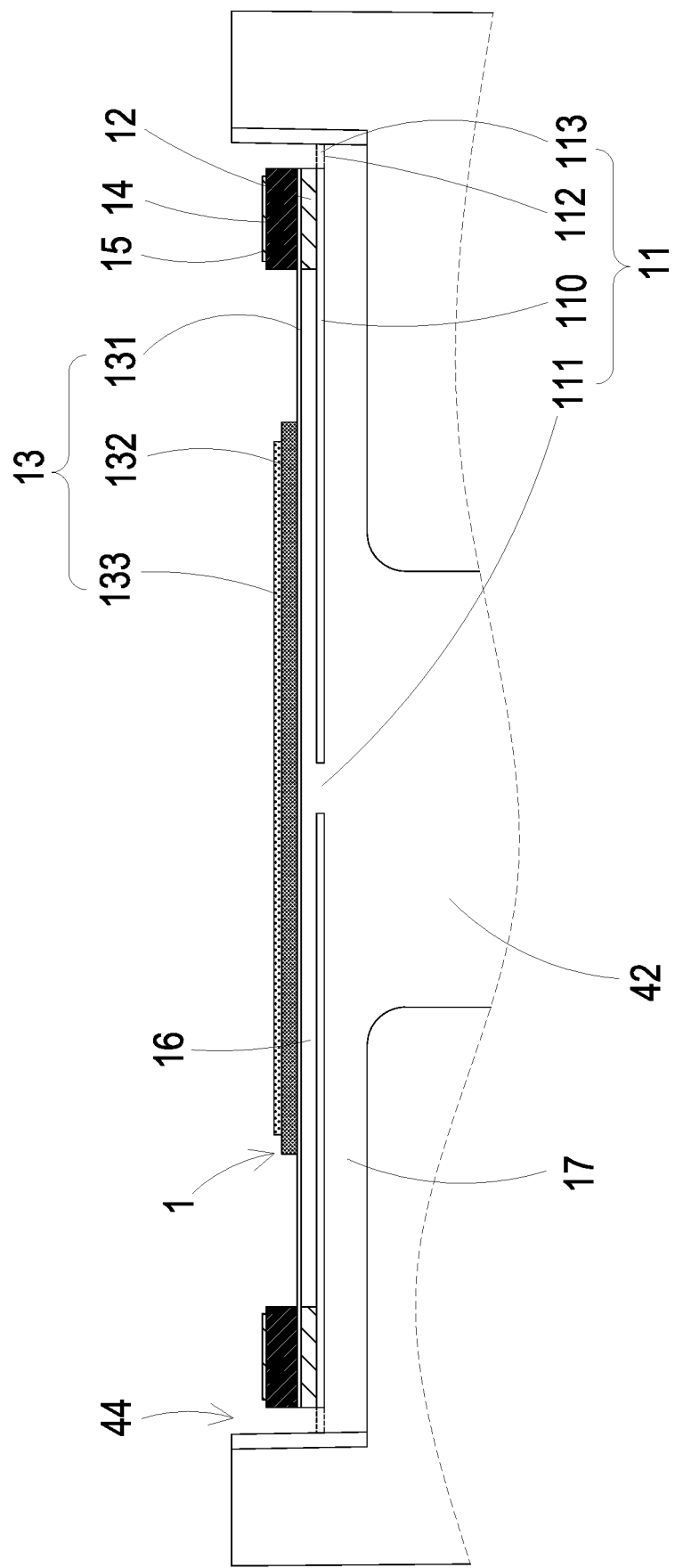
FIG. 6A is a schematic cross-sectional view of FIG. 2 taken along line A-A.

Please refer to FIGS. 3A, 3B and 6A. The plural connection components 112 define plural vacant spaces 113 between the suspension plate 110 and the inner edge of the accommodation slot 44 for the air flowing therethrough. The chamber bracket 12 can be a square hollow structure and is carried and stacked on the suspension plate 110 of the gas transporting plate 11. The actuator 13 is carried and stacked on the chamber bracket 12 to cover the square hollow structure so that a resonance chamber 16 is formed and enclosed by the gas transporting plate 11, the chamber bracket 12 and the actuator 13 collaboratively. The actuator 13 includes a piezoelectric carrying plate 131, an adjusting resonance plate 132 and a piezoelectric plate 133. The piezoelectric carrying plate 131 can be a metallic plate having an edge extending to form a first conductive pin 1311 for receiving current. Similarly, the adjusting resonance plate 132 can be a metallic plate and attached to a surface of the piezoelectric carrying plate 131 away from the gas transporting plate 11. The piezoelectric plate 133 is a plate made by a piezoelectric material, carried and stacked on the adjusting resonance plate 132. In response to an applied voltage, the piezoelectric plate 133 is deformed by the piezoelectric effect, and the piezoelectric carrying plate 131 is driven to vibrate in a reciprocating manner within a specific vibration frequency range. The adjusting resonance plate 132 is located between the piezoelectric plate 133 and the piezoelectric carrying plate 131, and served as a buffer between the piezoelectric plate 133 and the piezoelectric carrying plate 131. Thus, the vibration frequency of the piezoelectric carrying plate 131 can be adjusted. Basically, the adjusting resonance plate 132 is thicker than the piezoelectric carrying plate 131, and the thickness of the adjustment resonance plate 132 can be varied, thereby adjusting the vibration frequency of the actuator 13.

Please refer to FIGS. 2, 3A and 3B again. The insulation bracket 14 and the conducting bracket 15 are stacked sequentially on the actuator 13. A second conductive pin 151 is protruded from the outer edge of the conducting bracket 15, and an electrode 152 is curvedly protruded from the inner edge of the conducting bracket 15. The electrode 152 is electrically connected to the piezoelectric plate 133 of the actuator 13. The first conductive pin 1311 of the piezoelectric carrying plate 131 and the second conductive pin 151 of the conducting bracket 15 protrude outwardly from the first recess 442 and the second recess 443 of the accommodation slot 44, respectively, thereby being connected to external current and forming a loop circuit among the piezoelectric carrying plate 131, the adjusting resonance plate 132, the piezoelectric plate 133 and the conducting bracket 15. In addition, with the insulation bracket 14 disposed between the conducting bracket 15 and the piezoelectric carrying plate 131, it prevents the conducting bracket 15 and the piezoelectric carrying plate 131 from direct electrical connection and short current therebetween.

Please refer to FIG. 6A, wherein the air transporting actuator 1 is operated in an initial state. The gas transporting plate 11, the chamber bracket 12, the actuator 13, the insulation bracket 14 and the conducting bracket 15 are stacked on each other sequentially and disposed on the accommodation slot 44, so as to form the gas transporting actuator 1 of the present embodiment. In the embodiment, an airflow chamber 17 is formed between the gas transporting plate 11 and a bottom surface of the accommodation slot 44. The airflow chamber 17 is in fluid communication with the resonance chamber 16 defined by the actuator 13, the chamber bracket 12 and the suspension plate 110 collaboratively through the central aperture 111 of the gas transporting plate 11. By controlling the vibration frequency of the air in the resonance chamber 16 to be close or even the same as the vibration frequency of the suspension plate 110, the Helmholtz resonance effect can be generated between the resonance chamber 16 and the suspension plate 110. Thereby, air transportation efficiency is improved.

Figure 6B:
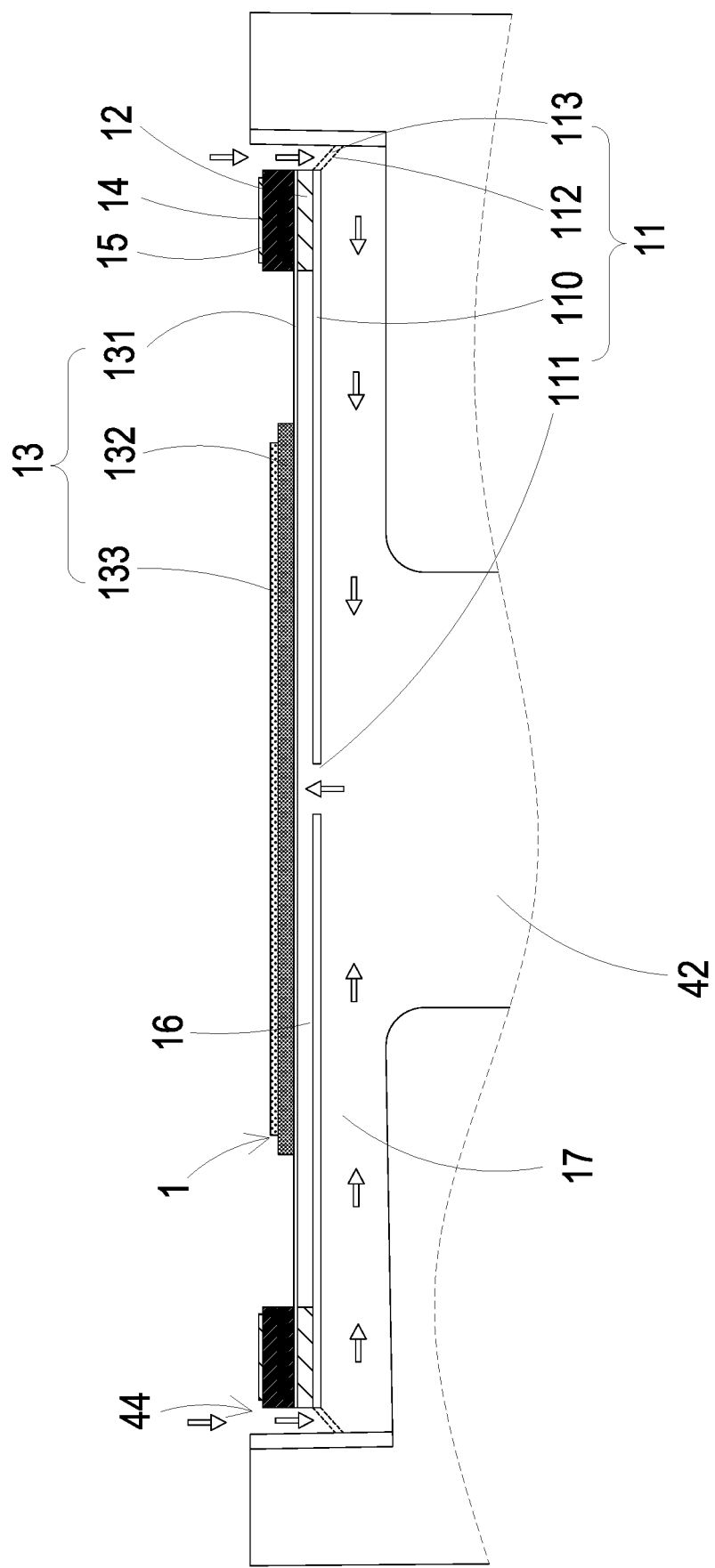
FIGS. 6B and 6C are schematic views illustrating actions of the gas transporting actuator of the first embodiment of the present disclosure.
Figure 6C:
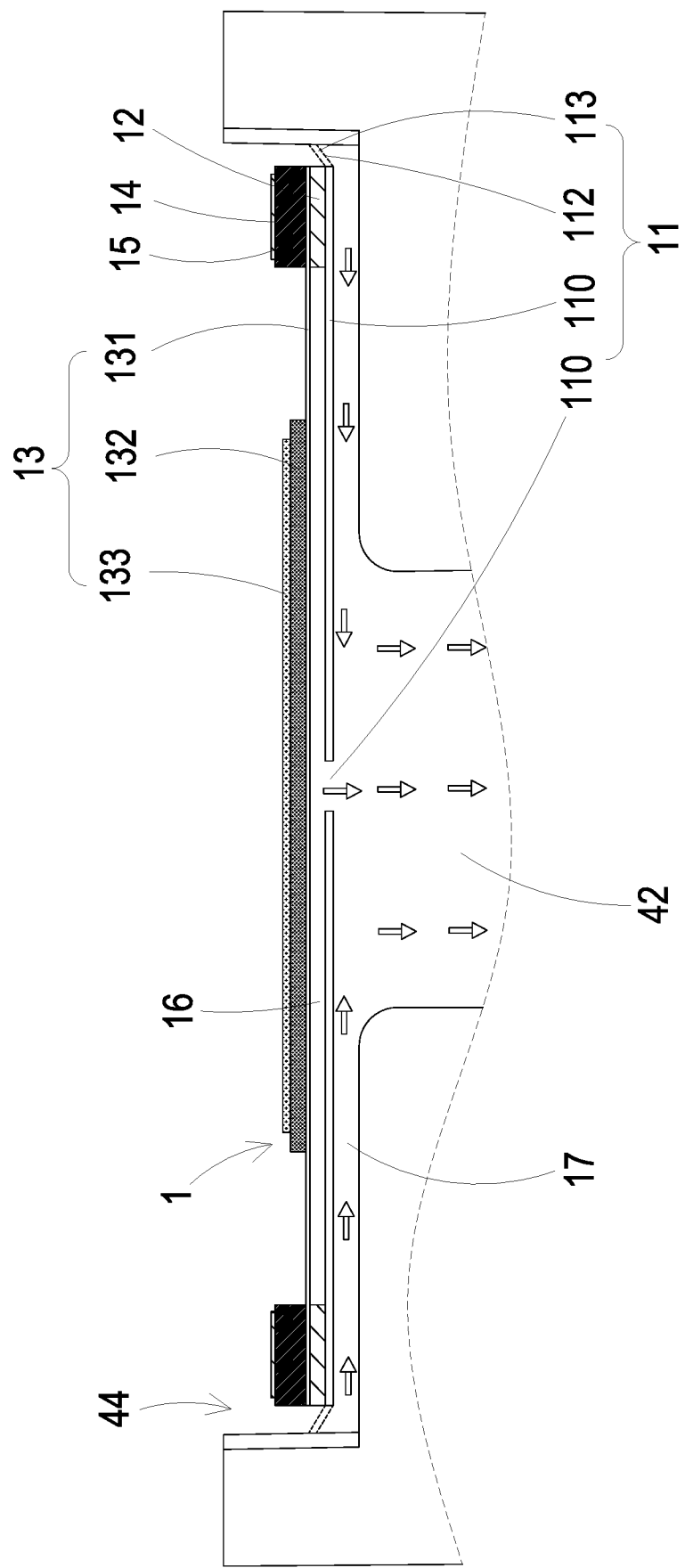
Figure 7:
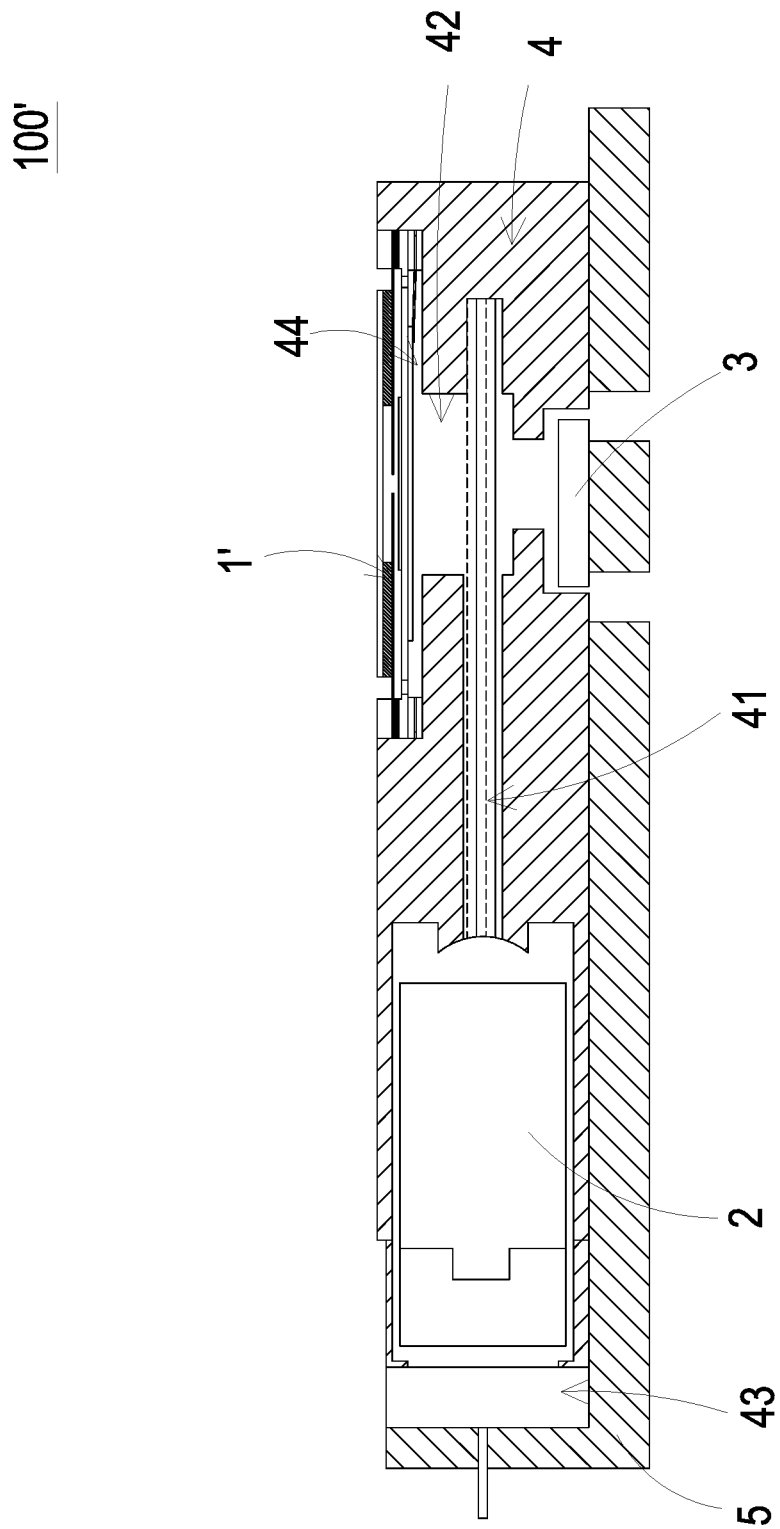
FIG. 7 is a schematic cross-sectional view illustrating a particulate matter measuring device according to a second embodiment of the present disclosure.

Then, as shown in FIG. 6B, when the piezoelectric plate 133 vibrates away from the bottom surface of the accommodation slot 44, the suspension plate 110 of the gas transporting plate 11 is vibrated away from the bottom surface of the accommodation slot 44, so that the volume of the airflow chamber 17 is rapidly expanded and the pressure in the airflow chamber 17 drops. The negative pressure of the airflow chamber 17 inhales the air from the external environment through the plural vacant spaces 113, and the air flows into the resonance chamber 16 through the central aperture 111, so that the pressure in the resonance chamber 16 increases to generate a pressure gradient. Furthermore, as shown in FIG. 6C, when the piezoelectric plate 133 drives the suspension plate 110 of the gas transporting plate 11 to vibrate toward the bottom surface of the accommodation slot 44, the air in the resonance chamber 16 quickly flows out through the central aperture 111, and the air in the airflow chamber 17 is compressed. Thus, the air converged is close to an ideal gas state of Bernoulli's principle and ejected out quickly in a large amount. Furthermore, the air is discharged out after flowing through the micro particle sensor 3 (referring to FIG. 1). According to the principle of inertia, the internal pressure of the resonance chamber 16 after exhausting is lower than the equilibrium air pressure, and the air is introduced to enter the resonance chamber 16 again. Therefore, the piezoelectric plate 133 is reciprocally vibrated, and the vibration frequency of the air in the resonance chamber 16 is controlled to be the same as the vibration frequency of the piezoelectric plate 133 to generate a Helmholtz resonance effect, so as to achieve the air transportation at high speed and in a large amount.

Please refer to FIGS. 7, 8A, 8B and 9A. In a second embodiment, the structure of the particulate matter measuring device 100' is substantially similar to the structure of the particulate matter measuring device 100 of the first embodiment, but the difference is in the gas transporting actuator 1'. In the second embodiment, the gas transporting actuator 1' includes an air inlet plate 11', a resonance plate 12', a piezoelectric actuator 13', a first insulation plate 14', a conducting plate 15' and a second insulation plate 16'. The air inlet plate 11', the resonance plate 12', the piezoelectric actuator 13', the first insulation plate 14', the first conducting plate 15' and the second insulation plate 16' are stacked and assembled sequentially.

In the embodiment, the air inlet plate 11' has at least one inlet 11a', at least one convergence channel 11b' and a convergence chamber 11c'. The convergence channel 11b' is aligned with the inlet 11a'. The inlet 11a' allows the air to flow in and the convergence channel 11b' guides the air from the inlet 11a' toward the convergence chamber 11c'. The resonance plate 12' has a central aperture 12a', a movable part 12b' and a fixing part 12c'. The central aperture 12a' is aligned with the convergence chamber 11c' of the air inlet plate 11'. The movable part 12b' surrounds the central aperture 12a' and the fixing part 12c' is disposed around the movable part 12b'. A chamber space 17' is formed between the resonance plate 12' and the piezoelectric actuator 13'. Thus, when the piezoelectric actuator 13' is driven, the air is inhaled through the inlet 11a' of the air inlet plate 11' and converged to the convergence chamber 11c' along the convergence channel 11b'. Then, the air passes through the central aperture 12a' of the resonance plate 12', whereby the air is further transported through a resonance between the piezoelectric actuator 13' and the movable part 12b' of the resonance plate 12'.

Please refer to FIGS. 7, 8A, 8B and 9. The piezoelectric actuator 13' includes a suspension plate 13a', an outer frame 13b', at least one bracket 13c' and a piezoelectric element 13d'. In the embodiment, the suspension plate 13a' is a square structure and permitted to undergo a bending vibration, but not limited thereto. The suspension plate 13a' has a bulge 13f'. In the embodiment, the suspension plate 13a' is designed in a square shape. In that, the structure of the suspension plate 13a' in a square shape is obviously advantageous in terms of power saving while being compared to a circular suspension plate. The capacitive load operating at the resonance frequency increases its power consumption as the resonance frequency increases. Since the resonance frequency of the suspension plate 13a' in the square shape is lower than that of the circular suspension plate, the power consumed is also low. However, in other embodiments, the shape of the suspension plate 13a' is adjustable according to the practical requirements. The outer frame 13b' is arranged around the suspension plate 13a'. The bracket 13c' is connected between the suspension plate 13a' and the outer frame 13b' for elastically supporting the suspension plate 13a'. A length of a side of the piezoelectric element 13d' is smaller than or equal to a length of a side of the suspension plate 13a'. The piezoelectric element 13d' is attached on a surface of the suspension plate 13a' to drive the suspension plate 13a' to undergo the bending vibration in response to an applied voltage. At least one vacant space 13e' is formed among the suspension plate 13a', the outer frame 13b' and the bracket 13c' for the air flowing therethough. The bulge 13f' is protruded from another surface of the suspension plate 13a'. In the embodiment, the suspension plate 13a' and the bulge 13f' are integrally formed from a single structure by using an etching process, but are not limited thereto.

Figure 9A:
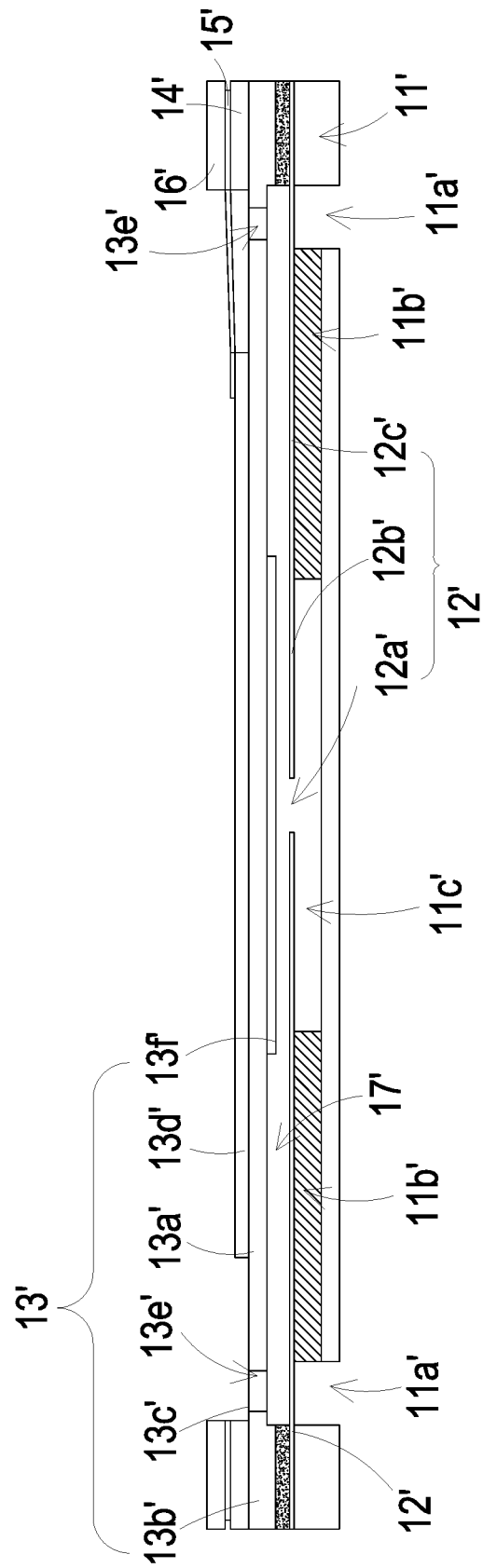
FIG. 9A is a schematic cross-sectional view illustrating the gas transporting actuator of the second embodiment of the present disclosure.

Please refer to FIG. 9A. In the embodiment, the chamber space 17' may be utilized a filler, for example but not limited to a conductive adhesive, to fill a gap generated between the resonance plate 12' and the outer frame 13b' of the piezoelectric actuator 13', so that a specific depth between the resonance plate 12' and the suspension plate 13a' can be maintained and thus the air is introduced to flow more rapidly. Moreover, since the proper distance between the suspension plate 13a' and the resonance plate 12' is maintained, the contact interference is reduced and the generated noise is largely reduced. In some embodiments, alternatively, the height of the outer frame 13b' of the piezoelectric actuator 13' is increased, so that the thickness of the conductive adhesive filled within the gap between the resonance plate 12' and the outer frame 13b' of the piezoelectric actuator 13' may be reduced. Thus, in the case where the suspension plate 13a' and the resonance plate 12' are maintained at a proper distance, the thickness of the conductive adhesive filled within the overall assembly of the gas transporting actuator 1' won't be affected by a hot pressing temperature and a cooling temperature, and it benefits to avoid that the conductive adhesive affects the actual size of the chamber space 17' due to the factors of thermal expansion and contraction after the assembly is completed.

Figure 9B:
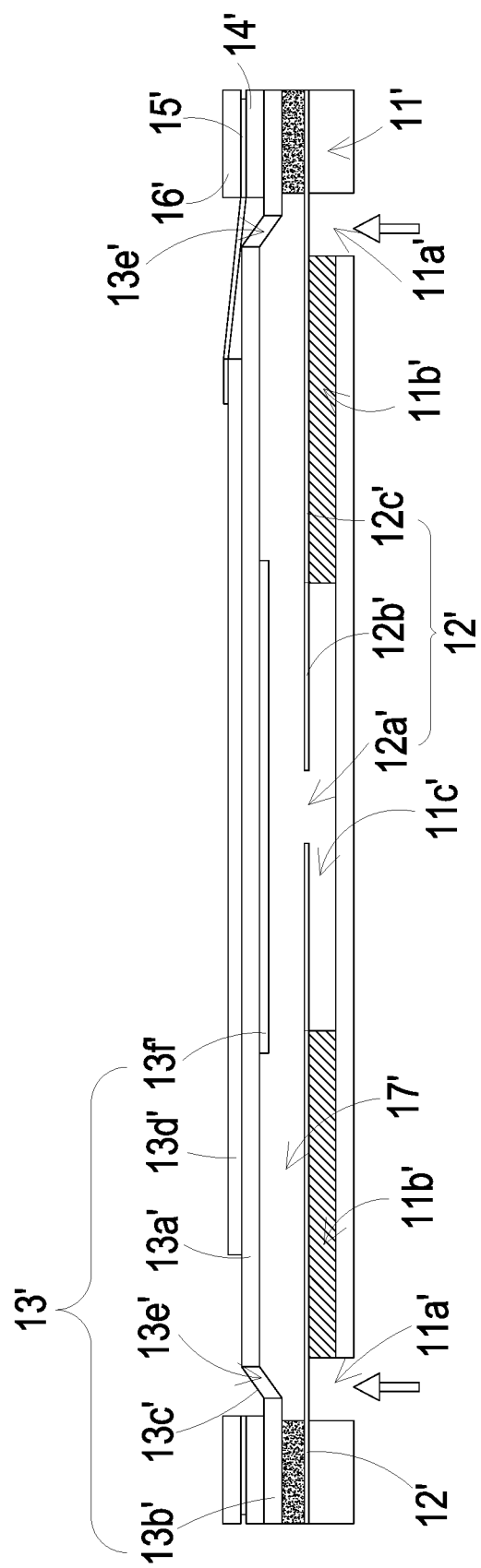
FIG. 9B is a schematic cross-sectional view of the gas transporting actuator according to another embodiment of the present disclosure.

Please refer to FIG. 9B. In other embodiments, the suspension plate 13a' can be formed by a stamping method. The stamping method makes the suspension plate 13a' extended outwardly at a distance, and the distance extended outwardly may be adjusted by the bracket 13c' formed between the suspension plate 13a' and the outer frame 13b', so that a surface of the bulge 13f on the suspension plate 13a' is not coplanar with a surface of the outer frame 13b'. Namely the surface of the bulge 13f is lower than the surface of the outer frame 13b'. A small amount of a filling material, for example a conductive adhesive, is applied to the assembly surface of the outer frame 13b' to attach the piezoelectric actuator 13' on the fixing part 12c' of the resonance plate 12' by means of hot pressing, so that the piezoelectric actuator 13' is assembled with the resonance plate 12'. In this way, the entire structure may be improved by adopting the stamping method to form the suspension plate 13a' of the piezoelectric actuator 13', thereby modifying the chamber space 17'. A desired size of the chamber space 17' may be satisfied by simply adjusting the distance as described made by the stamping method. It simplifies the structural design for adjusting the chamber space 17'. At the same time, it achieve the advantages of simplifying the process and saving the process time.

Figure 8A:
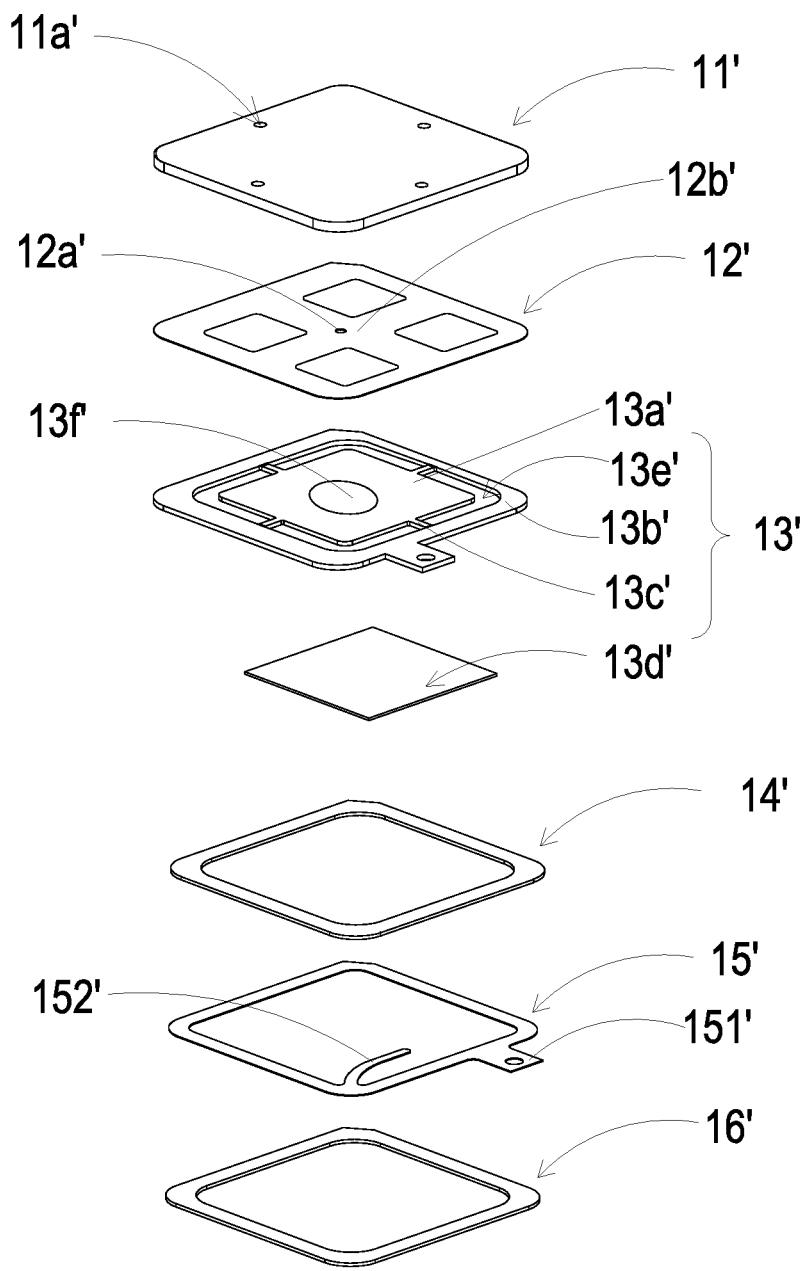
FIG. 8A is an exploded view illustrating the gas transporting actuator of the second embodiment of the present disclosure and taken from a top view.
Figure 8B:
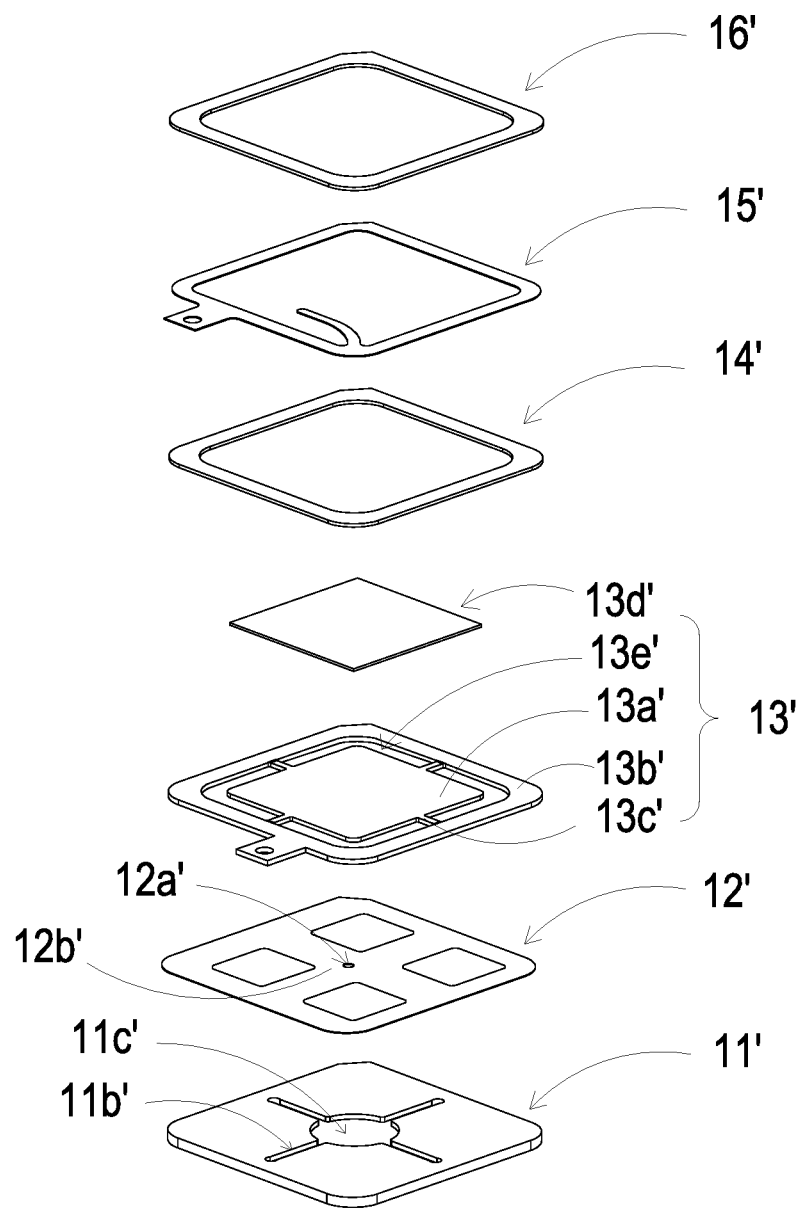
FIG. 8B is an exploded view illustrating the gas transporting actuator of the second embodiment of the present disclosure and taken from a bottom view.

Please refer to FIGS. 8A and 8B. In the embodiment, the first insulation plate 14', the conducting plate 15' and the second insulation plate 16' are all frame-shaped thin sheet, but not limited thereto. The air inlet plate 11', the resonance plate 12', the piezoelectric actuator 13', the first insulation plate 14', the conducting plate 15' and the second insulation plate 16' are all produced by a micro-electromechanical surface micromachining technology. Thereby, the volume of the gas transporting actuator 1' is reduced and a microelectromechanical system of the gas transporting actuator 1' is constructed.

Figure 9C:
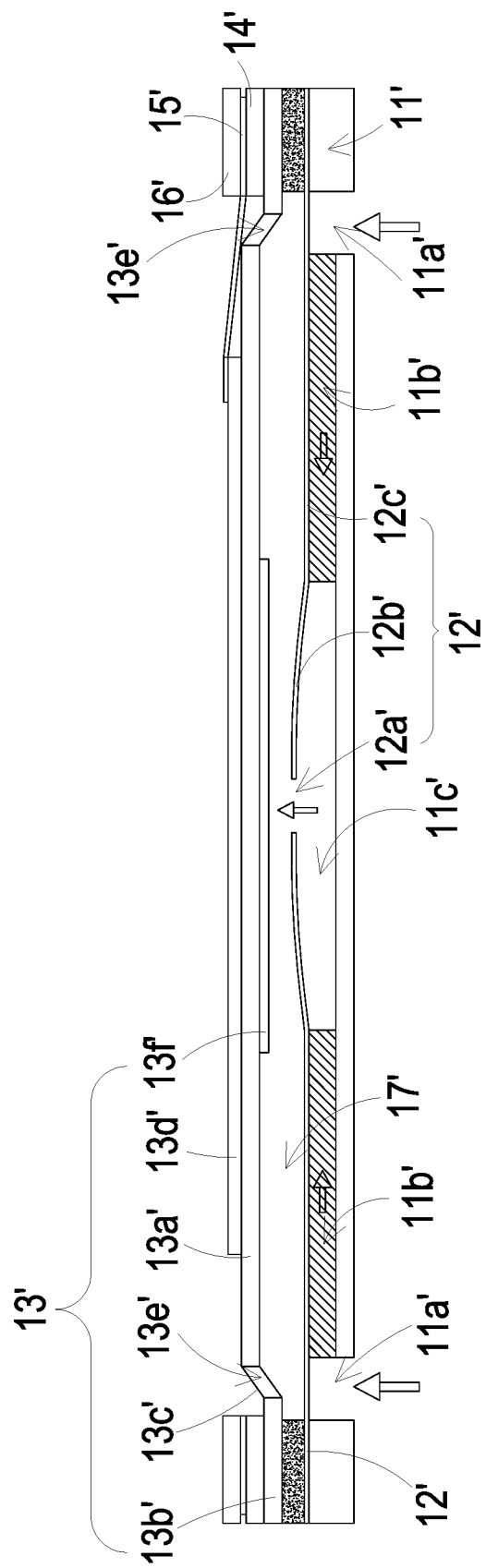
FIGS. 9C to 9E are schematic views illustrating actions of the gas transporting actuator of the second embodiment of the present disclosure.

Please refer to FIG. 9C. In the actions of the piezoelectric actuator 13', when the piezoelectric element 13d' of the piezoelectric actuator 13' is deformed in response to an applied voltage, the suspension plate 13a' is displaced in a direction away from the air inlet plate 11'. In that, the volume of the chamber space 17' is increased, a negative pressure is formed in the chamber space 17', and the air in the convergence chamber 11c' is inhaled into the chamber space 17'. At the same time, the resonance plate 12' is in resonance and thus displaced synchronously in the direction away from the air inlet plate 11'. Thereby, the volume of the convergence chamber 11c' is increased. Since the air in the convergence chamber 11c' flows into the chamber space 17', the convergence chamber 11c' is also in a negative pressure state, and the air is sucked into the convergence chamber 11c' by flowing through the inlet 11a' and the convergence channel 11b'.

Figure 9D:
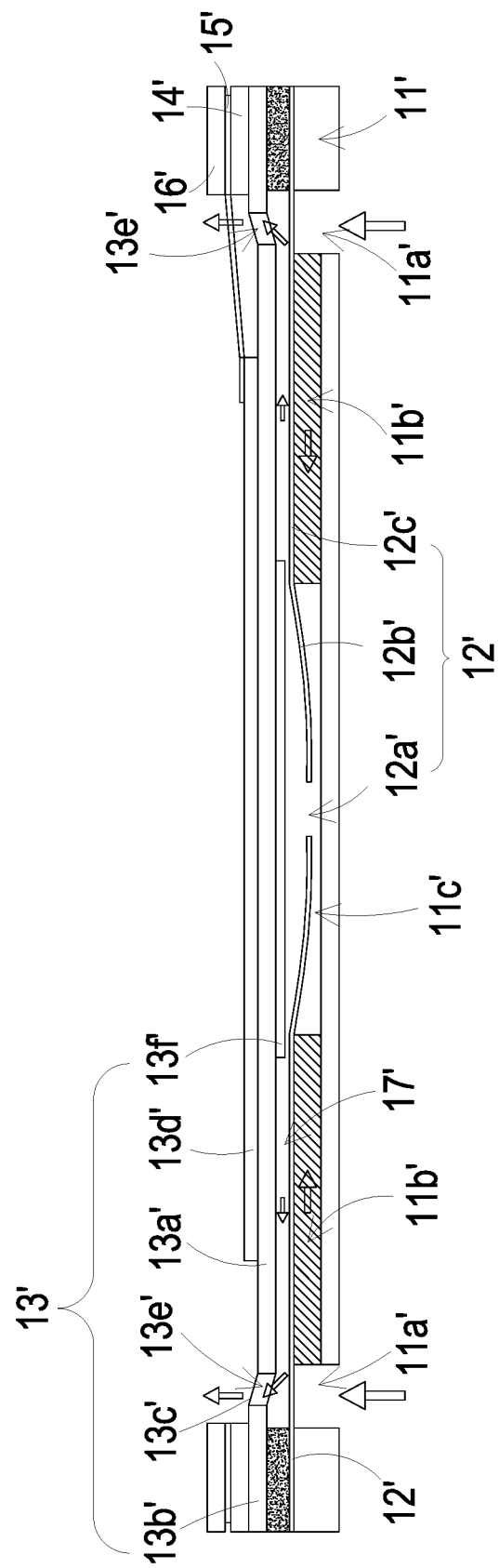

Then, as shown in FIG. 9D, the piezoelectric element 13d' drives the suspension plate 13a' to be displaced toward the air inlet plate 11' to compress the chamber space 17'. Similarly, the resonance plate 12' is actuated by the suspension plate 13a' (i.e., in resonance with the suspension plate 13a') and is displaced toward the air inlet plate 11'. Thus, the air in the chamber space 17' is compressed synchronously and forced to be further transported through the vacant space 13e' to achieve the effect of air transportation.

Figure 9E:
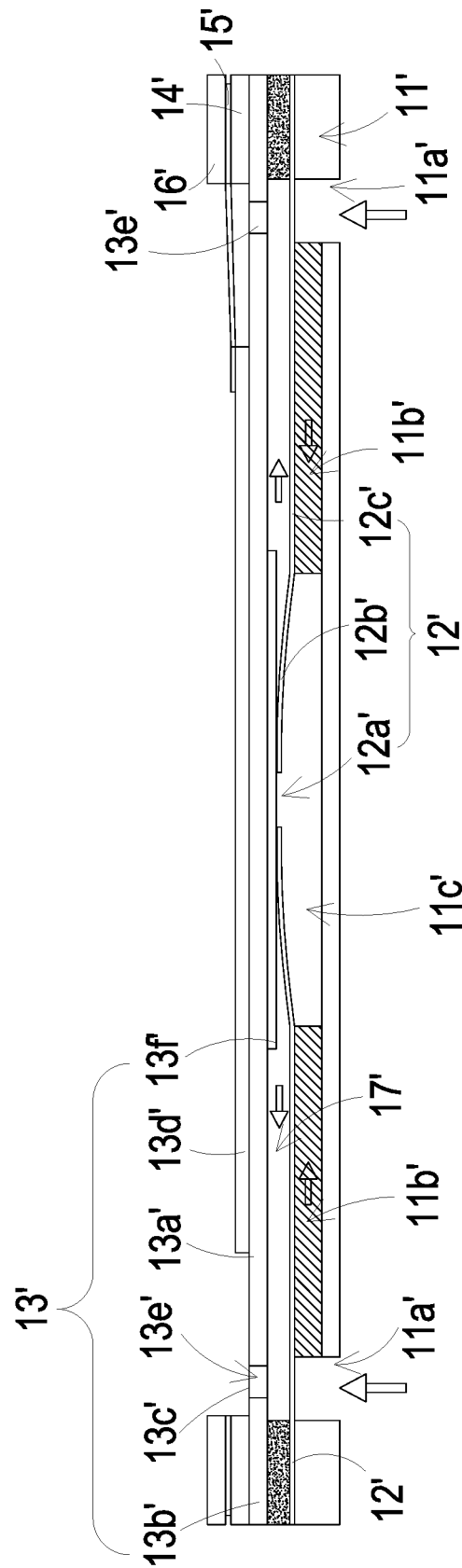

Finally, as shown in FIG. 9E, when the suspension plate 13a' is vibrated back to the initial state, which is not driven by the piezoelectric element 13d', the resonance plate 12' is also driven to displace in the direction away from the air inlet plate 11' at the same time. In that, the resonance plate 12' pushes the air in the chamber space 17' toward the vacant space 13e', and the volume of the convergence chamber 11c' is increased. Thus, the air can continuously flow through the inlet 11a' and the convergence channel 11b' and be converged in the confluence chamber 11c'. By repeating the actions of the gas transporting actuator 1' shown in the above-mentioned FIGS. 9C to 9E continuously, the gas transporting actuator 1' can continuously transport the air at a high speed to accomplish the air transportation and output operations of the gas transporting actuator 1'.

Furthermore, please refer to FIGS. 8A and 8B. A conductive pin 151' is protruded from an outer edge of the conducting plate 15', and an electrode 152' is curvedly protruded from an inner edge of the conducting plate 15'. The electrode 152' is electrically connected to the piezoelectric element 13d' of the piezoelectric actuator 13'. The conductive pin 151' of the conducting plate 15' is externally connected to the current for driving the piezoelectric element 13d' of the piezoelectric actuator 13'. In addition, the arrangement of the first insulating plate 14' and the second insulating plate 16' can avoid the occurrence of a short circuit.

Figure 10:
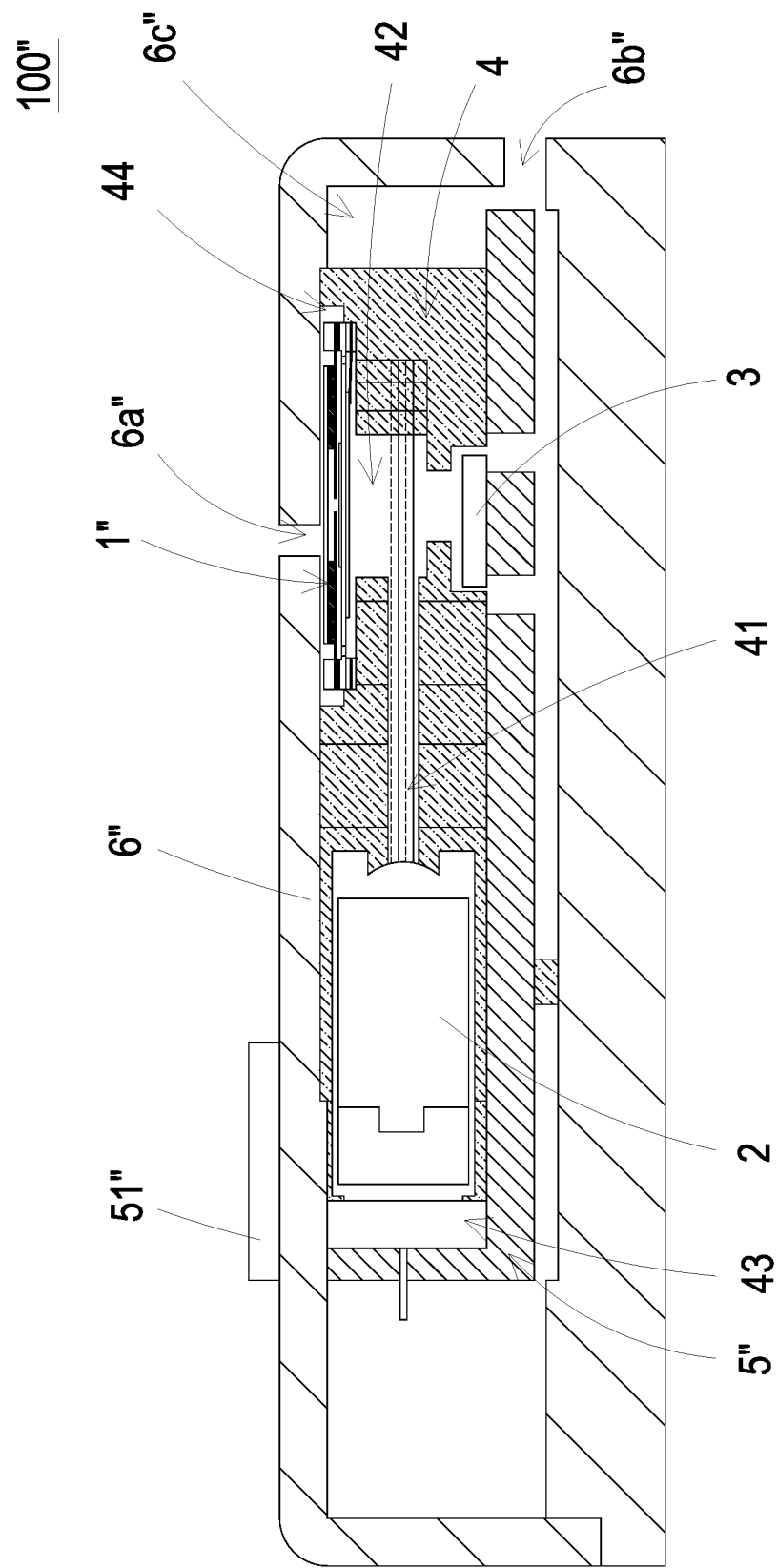
FIG. 10 is a schematic cross-sectional view illustrating a particulate matter measuring device according to a third embodiment of the present disclosure.

Please refer to FIG. 10. In the third embodiment, a particulate matter measuring device 100" of the present disclosure is provided and has a structure substantially the same as the structures of the particulate matter measuring device 100 of the first embodiment and the particulate matter measuring device 100' of the second embodiment, except that the particulate matter measuring device 100" further includes a housing 6" and the installation of the transmission module 51" included in the driving circuit module 5" is different. In the present embodiment, the structure of the gas transporting actuator 1" is the same as that of the gas transporting actuator 1 of the first embodiment, or the same as that of the gas transporting actuator 1' of the second embodiment, but not limited thereto. The housing 6" has an inlet 6a", an outlet 6b" and an inside chamber 6c" formed inside the housing 6". The inlet 6a" and the outlet 6b" are in fluid communication with the inside chamber 6c" and the outside of the housing 6", whereby the air is allowed to flow into the inside chamber 6c" though the inlet 6a" and be discharged to the outside of the housing 6" through the outlet 6b". The gas transporting actuator 1", the laser module 2, the micro particle sensor 3 and the irradiating mechanism 4 are all disposed in the inside chamber 6c", and the gas transporting actuator 1" is disposed adjacent to the inlet 6a", so as to inhale the air through the inlet 6a". In addition, in the embodiment, the transmission module 51" of the driving circuit module 5" is disposed outside the housing 6" for transmitting the detected value to the external connection device, and the position where the transmission module 51" disposed may prevent the quality of the transmitted signal from interference by the installation of the housing 6".

When the gas transporting actuator 1" is driven, the gas transporting actuator 1" starts to inhale the air through the inlet 6a" and transport the air into the airflow channel 42 of the irradiating mechanism 4. The air entering the airflow channel 42 is irradiated by the laser beam, which is emitted through the light-beam channel 41 by the laser module 2. When the laser beam irradiates the suspended particles in the air, a plurality of scattered light spots are generated, and the micro particle sensor 3 receives the plurality of scattered light spots and transmits the detected result to the microprocessor. The microprocessor calculates sizes and concentrations of the suspended particles in the air according to the numbers and intensities of the scattered light spots, thereby generating a detected value for storage. Then, the detected value stored in the microprocessor is transmitted to the external connection device by the transmission module 51".

Figure 11:
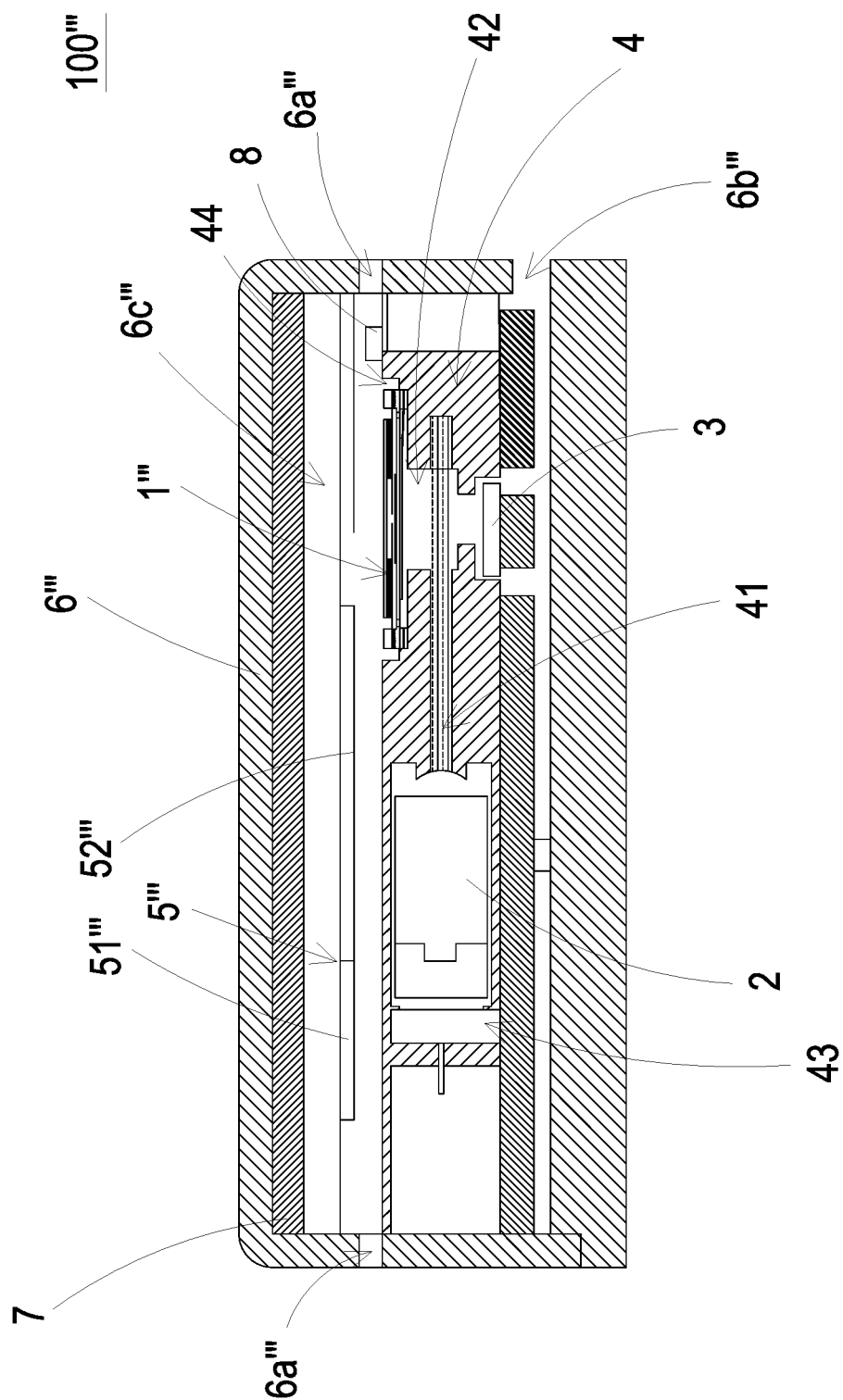
FIG. 11 is a schematic cross-sectional view illustrating a particulate matter measuring device according to a fourth embodiment of the present disclosure.

Please refer to FIG. 11. In the fourth embodiment, a particulate matter measuring device 100''' of the present disclosure is provided and has a structure substantially the same as the structures of the particulate matter measuring device 100 of the first embodiment, the particulate matter measuring device 100' of the second embodiment and the particulate matter measuring device 100" of the third embodiment, except that the particulate matter measuring device 100''' further includes a battery module 7 and a gas sensor 8, and the structure of the housing 6''' and the arranged position of the driving circuit module 5''' are different. In the embodiment, the structure of the gas transporting actuator 1''' is the same as that of the gas transporting actuator 1 of the first embodiment, or the same as that of the gas transporting actuator 1' of the second embodiment. The housing 6''' has plural inlets 6a''' disposed on two opposite sides of the housing 6''', respectively. The gas transporting actuator 1''', the laser module 2, the MICRO particle sensor 3 and the irradiating mechanism 4 are disposed between the inlets 6a'''. In the embodiment, the gas sensor 8 is disposed within the housing 6''' and adjacent to one of the inlets 6a''' of the housing 6''', so that the air inhaled through the inlet 6a''' can be immediately detected to obtain a concentration of a specific gas composition in the air. In an embodiment, the gas sensor 8 can be one selected from the group consisting of an oxygen sensor, a carbon monoxide sensor, a carbon dioxide sensor and combinations thereof. In another embodiment, the gas sensor 8 can be a volatile organic compound sensor. In other embodiments, the gas sensor 8 can be one selected from the group consisting of a sensor for a bacterium, a sensor for a virus, a sensor for a microorganism and combinations thereof. In the embodiment, the transmission module 51''' and the microprocessor 52''' of the driving circuit module 5''' are adjacent to each other and disposed within the inside chamber 6c''' of the housing 6'''. The battery module 7 is disposed within the inside chamber 6c''' and located at the side of the inside chamber 6c''' away from the outlet 6b'''. The battery module 7 is electrically connected to an external power supply device (not shown) to receive electrical energy for storage, provide the electrical energy and output the electrical energy to the gas transporting actuator 1''', the laser module 2, the micro particle sensor 3 and the gas sensor 8. The external power supply device can transmit the electrical energy to the battery module 7 by means of a wired transmission technology or transmit the electrical energy to the battery module 7 by a wireless transmission technology, but not limited thereto.

When the microprocessor 52''' drives the gas transporting actuator 1''', the gas transporting actuator 1''' starts to inhale the air through the inlet 6a''' and transport the air into the airflow channel 42 of the irradiating mechanism 4. Before detecting the suspended particles in the air, the gas sensor 8 adjacent to the inlet 6a''' detects the air entering from the inlet 6a''' firstly and transmits the detected result to the microprocessor 52'''.

In summary, the present disclosure provides a particulate matter measuring device having the gas sensor and the micro particle sensor respectively. By using the gas transporting actuator, the air is inhaled from the outside of the gas transporting actuator through the inlet. The air inhaled through the inlet and flowing toward the airflow channel is detected by the gas sensor to obtain a concentration of a specific gas composition in the air. When the laser beam irradiates the suspended particles in the air to generate a plurality of scattered light spots, the plurality of the scattering sports are detected by the micro particle sensor so as to calculate concentrations of suspended particles PM2.5 and suspended particles PM10 in the air according to the numbers and intensities of the scattered light spots. In addition, the gas transporting actuator is used to perform a cleaning operation on the micro particle sensor, so as to prevent excessive suspended particles from depositing on the micro particle sensor and causing inaccurate detection.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A particulate matter measuring device used for measuring a concentration of suspended particles in air, comprising:
    a gas transporting actuator comprises a gas outlet;
    a micro particle sensor disposed corresponding in position to the gas outlet of the gas transporting actuator and comprising a first surface, wherein the first surface faces the gas outlet of the gas transporting actuator; and
    a laser module disposed between the gas transporting actuator and the micro particle sensor, wherein the laser module is configured to emit a laser beam between the gas transporting actuator and the micro particle sensor, wherein the air flowing between the gas transporting actuator and the micro particle sensor is irradiated by the laser beam and the micro particle sensor analyzes sizes of the suspended particles in the air to calculate the concentration of the suspended particles in the air.

2. The particulate matter measuring device according to claim 1, further comprising an irradiating mechanism disposed between the gas transporting actuator and the micro particle sensor, wherein:
    the irradiating mechanism comprises an airflow channel, a light-beam channel, a light-source receiving slot and an accommodation slot;
    the light-beam channel is in communication with the airflow channel and the laser module is disposed within the light-source receiving slot, thereby the laser module emitting the layer beam to the light-bean channel to irradiate the air flowing through the airflow channel;
    the gas transporting actuator is accommodated within the accommodation slot; and
    the micro particle sensor is disposed in the airflow channel and located at an end of the airflow channel away from the gas transporting actuator, wherein after the laser beam irradiates the air in the airflow channel, the micro particle sensor detects scattered light spots generated by the suspended particles, so as to calculate accordingly the sizes and the concentration of the suspended particles contained in the air.

3. The particulate matter measuring device according to claim 2, wherein the gas transporting actuator comprises:
    a gas transporting plate having plural connection components, a suspension plate and a central aperture, wherein the suspension plate is permitted to undergo a bending vibration, and the gas transporting plate is disposed and positioned within the accommodation slot by the plural connection components, so that an airflow chamber is formed between the gas transporting plate and a bottom surface of the accommodation slot, and the plural connection components divide space between the suspension plate and the accommodation slot into at least one vacant space;
    a chamber bracket carried and stacked on the suspension plate;
    an actuator carried and stacked on the chamber bracket, wherein the actuator is configured to bend and vibrate in a reciprocating manner by an applied voltage;
    an insulation bracket carried and stacked on the actuator; and
    a conducting bracket carried and stacked on the insulation bracket;
    wherein a resonance chamber is defined by the actuator, the chamber bracket and the suspension plate collaboratively, wherein by driving the actuator to drive the gas transporting plate to generate a resonance, the suspension plate of the gas transporting plate vibrates and displaces in a reciprocating manner, so as to make the air flow through the at least one vacant space into the airflow chamber and then discharged into the airflow channel, wherein the accommodation slot of the irradiating mechanism has plural fixing recesses.

4. The particulate matter measuring device according to claim 3, wherein the actuator comprises:
    a piezoelectric carrying plate carried and stacked on the chamber bracket;
    an adjusting resonance plate carried and stacked on the piezoelectric carrying plate; and a piezoelectric plate carried and stacked on the adjusting resonance plate, wherein the piezoelectric plate is configured to drive the piezoelectric carrying plate and the adjusting resonance plate to bend and vibrate in the reciprocating manner by the applied voltage, wherein the adjusting resonance plate is thicker than the piezoelectric carrying plate.

5. The particulate matter measuring device according to claim 3, wherein each of the plural connection components has a fixing part and a connection part, wherein the fixing part and the fixing recess have shapes corresponding to each other, the connection part is connected between the suspension plate and the fixing part, and the connection part elastically supports the suspension plate for allowing the suspension plate to bend and vibrate in the reciprocating manner.

6. The particulate matter measuring device according to claim 1, wherein the gas transporting actuator comprises:
an air inlet plate having at least one inlet, at least one convergence channel and a convergence chamber, wherein at least one convergence channel is aligned with the at least one inlet, and the at least one inlet allows the air to flow in and the convergence channel guides the air from the inlet toward the convergence chamber;
a resonance plate having a central aperture and a movable part, wherein the central aperture is aligned with the convergence chamber and the movable part surrounds the central aperture; and
a piezoelectric actuator aligned with the resonance plate, wherein a chamber space is formed between the resonance plate and the piezoelectric actuator, so that the air from the at least one inlet of the air inlet plate is converged to the convergence chamber along the at least one convergence channel and flows into the chamber space through the central aperture of the resonance plate when the piezoelectric actuator is driven, whereby the air is further transported through a resonance between the piezoelectric actuator and the movable part of the resonance plate,
wherein the air inlet plate, the resonance plate and the piezoelectric actuator are stacked sequentially.

7. The particulate matter measuring device according to claim 6, wherein the piezoelectric actuator comprises:
a suspension plate being a square suspension plate and permitted to undergo a bending vibration;
an outer frame arranged around the suspension plate;
at least one bracket connected between the suspension plate and the outer frame for elastically supporting the suspension plate; and
a piezoelectric element, wherein a length of a side of the piezoelectric element is smaller than or equal to a length of a side of the suspension plate, and the piezoelectric element is attached on a surface of the suspension plate to drive the suspension plate to undergo the bending vibration in response to an applied voltage.

8. The particulate matter measuring device according to claim 1, wherein the suspended particles detected by the micro particle sensor are one selected from the group consisting of suspended particles PM2.5, suspended particles PM10 and a combination thereof.

9. The particulate matter measuring device according to claim 1, wherein the gas transporting actuator ejects the air at high speed to perform a cleaning operation on a surface of the micro particle sensor, thereby removing the suspended particles attached on the surface of the micro particle sensor to maintain accuracy of the micro particle sensor for each time of detection.

10. The particulate matter measuring device according to claim 1, further comprising a driving circuit module, wherein the driving circuit module comprises a microprocessor and a transmission module, the transmission module is at least one selected from the group consisting of a wired transmission module and a wireless transmission module, the microprocessor is used to drive the gas transporting actuator, the laser module and the micro particle sensor, and analyze and transfer a detected result from the micro particle sensor into a detected value, and the transmission module transmits the detected value to an external connection device to display the detected value and a notification alert through the external connection device.

11. The particulate matter measuring device according to claim 10, wherein the wired transmission module is at least one selected from the group consisting of USB, mini-USB and micro-USB.

12. The particulate matter measuring device according to claim 11, wherein the wireless transmission module is at least one selected from the group consisting of a Wi-Fi module, a Bluetooth module, a radio frequency identification module and a near field communication module.

13. The particulate matter measuring device according to claim 10, wherein the external connection device is at least one selected from the group consisting of a cloud system, a portable device and a computer system.

14. The particulate matter measuring device according to claim 10, further comprising a battery module for storing electrical energy and providing electrical energy, so that the microprocessor is permitted to drive the gas transporting actuator, the laser module and the micro particle sensor, wherein the battery module is electrically connected to an external power supply device to receive electrical energy for storage.

15. The particulate matter measuring device according to claim 2, further comprising a housing,
wherein the housing has an inlet, an outlet and an inside chamber disposed therein, wherein the inside chamber is in fluid communication with the inlet and the outlet;
the irradiating mechanism is disposed within the inside chamber and the airflow channel is in fluid communication with the inlet and the outlet; and
the gas transporting actuator is aligned with the inlet of the housing, so as to be driven to inhale the air through the inlet and discharge the air out of the housing through the outlet.

16. The particulate matter measuring device according to claim 15, further comprising a gas sensor disposed within the housing to detect the air flowing into the inlet, so as to obtain a concentration of a specific gas composition contained in the air.

17. The particulate matter measuring device according to claim 16, wherein the gas sensor is at least one selected from the group consisting of an oxygen sensor, a carbon monoxide sensor, a carbon dioxide sensor and combinations thereof.

18. The particulate matter measuring device according to claim 16, wherein the gas sensor is a volatile organic compound sensor.

19. The particulate matter measuring device according to claim 16, wherein the gas sensor is a sensor for detecting at least one selected from the group consisting of a bacterium, a virus, a microorganism and combinations thereof.

20. A particulate matter measuring device used for measuring a concentration of suspended particles in air, comprising:
- at least one gas transporting actuator comprising a gas outlet;
- at least one micro particle sensor disposed corresponding in position to the gas outlet of the gas transporting actuator and comprising a first surface, wherein the first surface faces the gas outlet of the gas transporting actuator; and
- at least one laser module disposed between the gas transporting actuator and the micro particle sensor, wherein the laser module is configured to emit a laser beam between the gas transporting actuator and the micro particle sensor,
- wherein the air flowing between the gas transporting actuator and the micro particle sensor is irradiated by the laser beam and the micro particle sensor analyzes sizes of the suspended particles in the air to calculate the concentration of the suspended particles in the air.

* * * * *